United States Patent
Iura et al.

(10) Patent No.: US 12,452,782 B2
(45) Date of Patent: Oct. 21, 2025

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventors: Masataka Iura, Chiba (JP); Mitsuru Konji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 18/058,671

(22) Filed: Nov. 23, 2022

(65) Prior Publication Data

US 2023/0171682 A1 Jun. 1, 2023

(30) Foreign Application Priority Data

Nov. 29, 2021 (JP) .................................. 2021-193680

(51) Int. Cl.
*H04W 48/18* (2009.01)
*H04W 12/03* (2021.01)
*H04W 68/00* (2009.01)
*H04W 76/10* (2018.01)

(52) U.S. Cl.
CPC ........... *H04W 48/18* (2013.01); *H04W 12/03* (2021.01); *H04W 68/00* (2013.01); *H04W 76/10* (2018.02)

(58) Field of Classification Search
CPC ..... H04W 48/18; H04W 12/03; H04W 68/00; H04W 76/10; H04W 12/06; H04W 12/50; H04W 76/18
See application file for complete search history.

(56) References Cited

U.S. PATENT DOCUMENTS

| 8,607,048 | B2 * | 12/2013 | Nogawa | H04L 63/205 |
| | | | | 713/168 |
| 8,625,552 | B2 * | 1/2014 | Gupta | H04L 12/2807 |
| | | | | 370/349 |
| 9,467,187 | B2 * | 10/2016 | Lee | H04W 8/205 |
| 9,629,077 | B2 * | 4/2017 | Sumiuchi | H04W 48/20 |
| 9,712,486 | B2 * | 7/2017 | Johnson | H04L 41/08 |
| 10,244,563 | B2 * | 3/2019 | Sumiuchi | H04W 4/80 |

(Continued)

FOREIGN PATENT DOCUMENTS

JP 2016127545 A 7/2016

*Primary Examiner* — Eunsook Choi
(74) *Attorney, Agent, or Firm* — Canon U.S.A., Inc. IP Division

(57) ABSTRACT

A method of an information processing apparatus, the information processing apparatus configured to communicate with a communication apparatus and the method performed by executing a first application. The method including: receiving first information concerning the communication apparatus, displaying, based on it being determined that the communication apparatus is not able to connect to a first network based on the first information, information concerning a second network which is different from the first network and to which the communication apparatus is able to connect, based on the first information, and starting a second application which is an application different from the first application and which transmits, to the communication apparatus via a communication with the communication apparatus, connection information which is used for the communication apparatus to connect to any one of networks.

16 Claims, 11 Drawing Sheets

(56) References Cited

U.S. PATENT DOCUMENTS

| | | | | |
|---|---|---|---|---|
| 11,991,678 B2* | 5/2024 | Umehara | ............... | H04W 12/06 |
| 12,063,593 B2* | 8/2024 | Chun | ..................... | H04W 48/18 |
| 2005/0165953 A1* | 7/2005 | Oba | .................... | H04L 12/4633 |
| | | | | 709/225 |

* cited by examiner

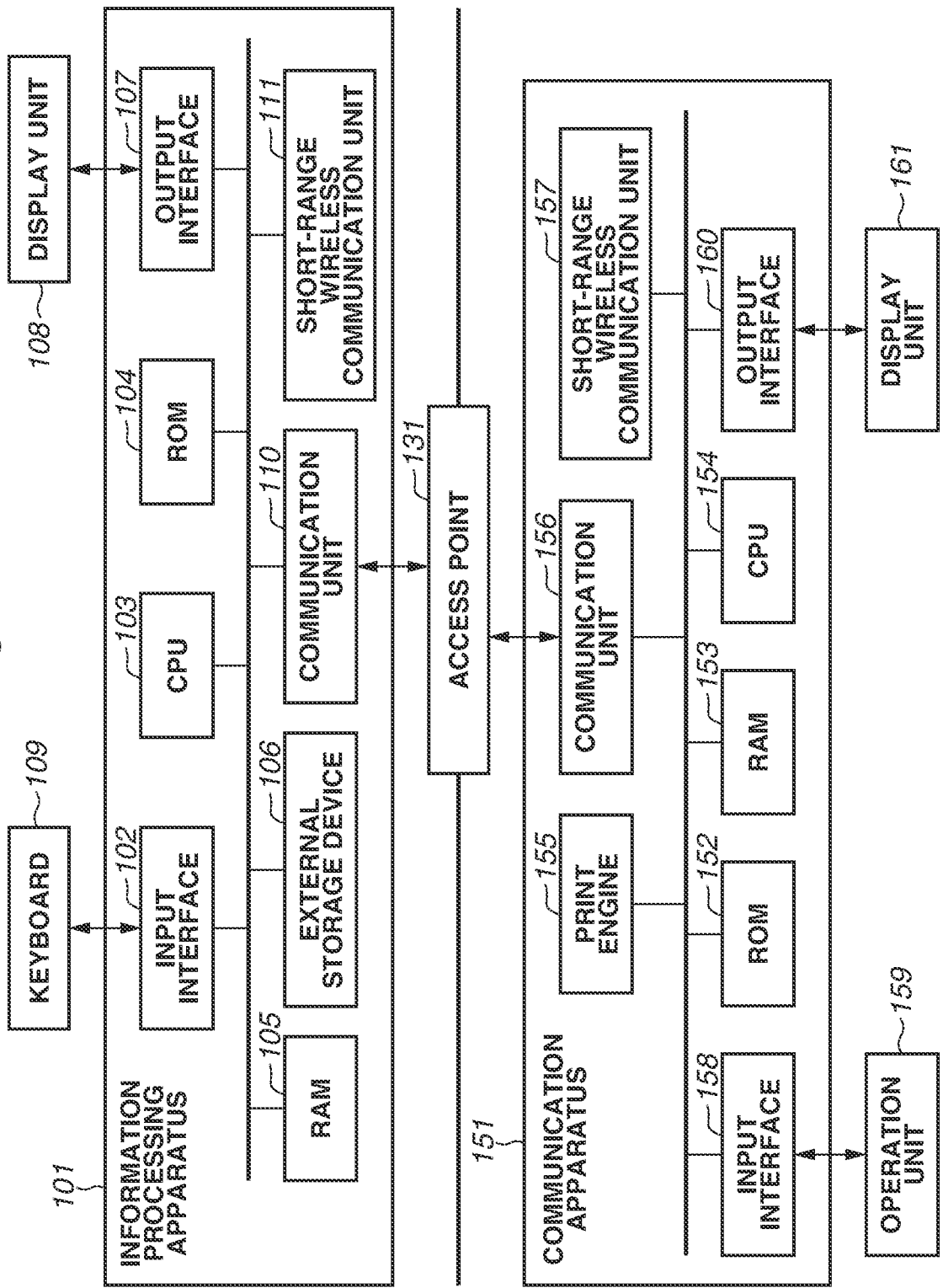

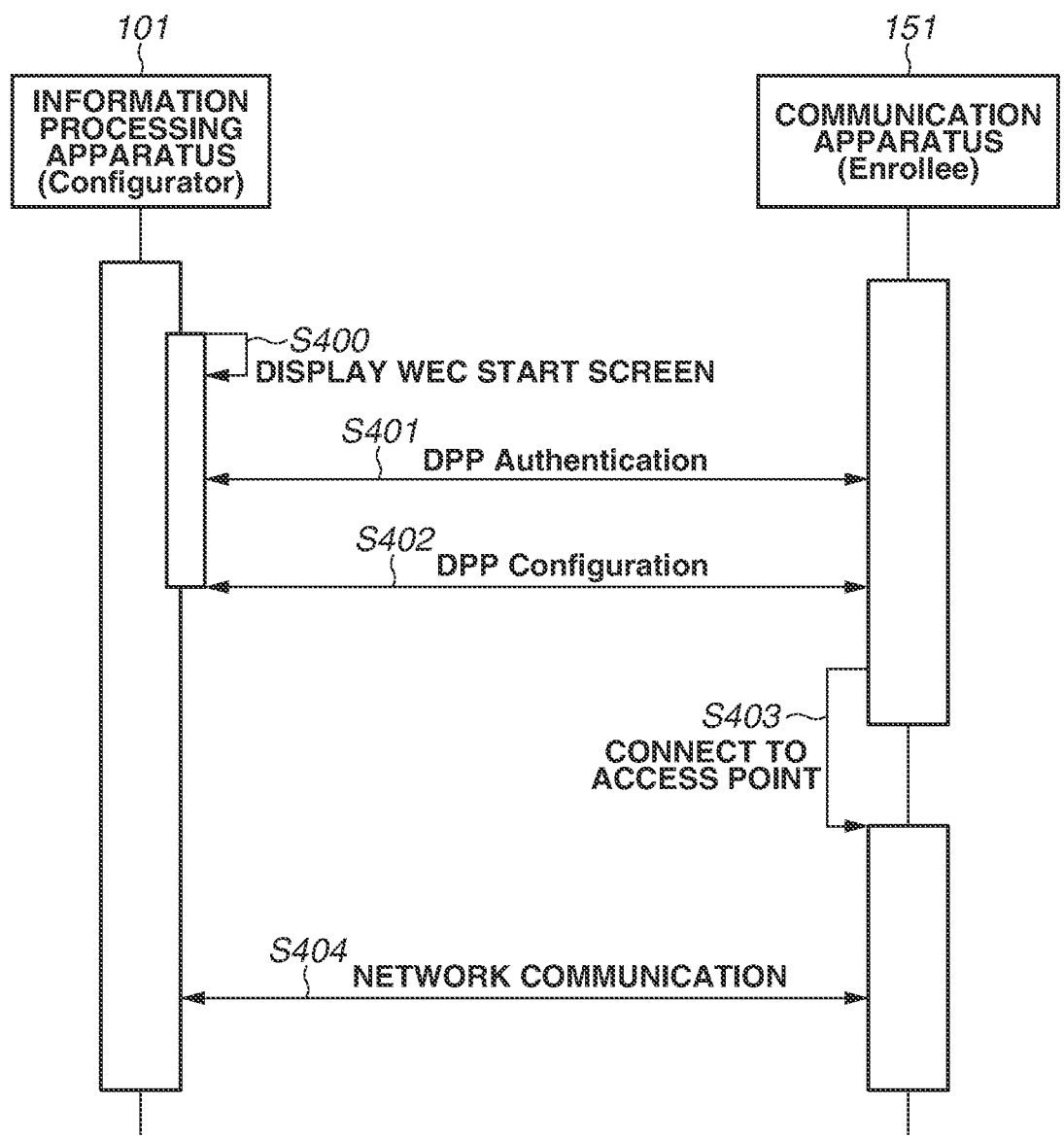

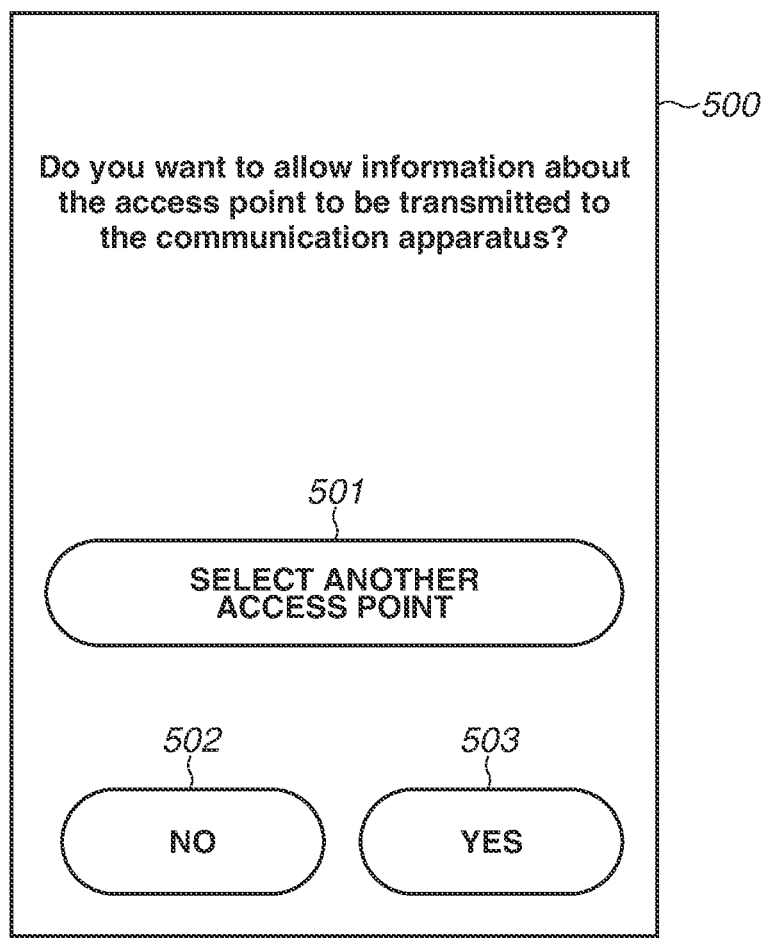

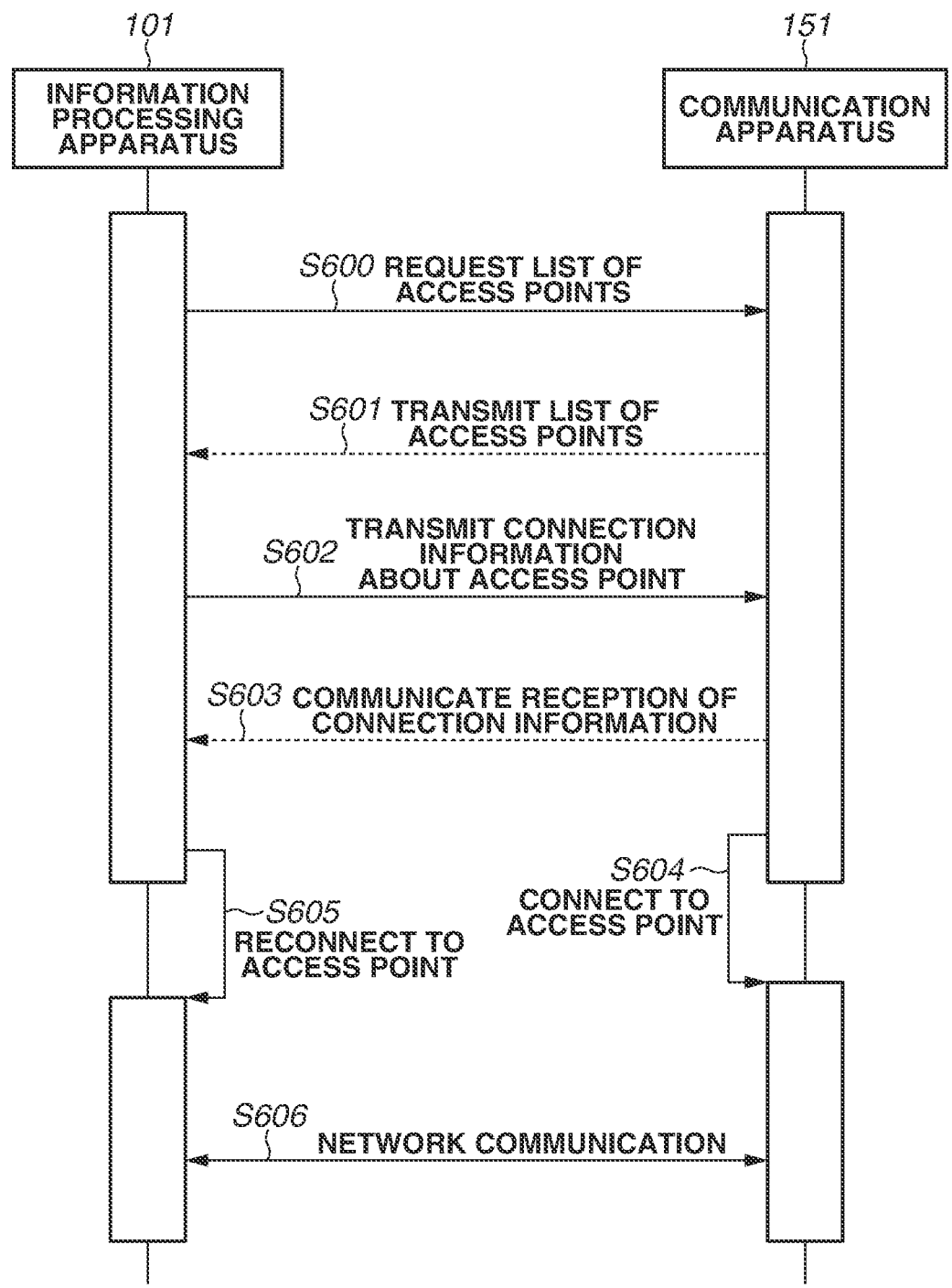

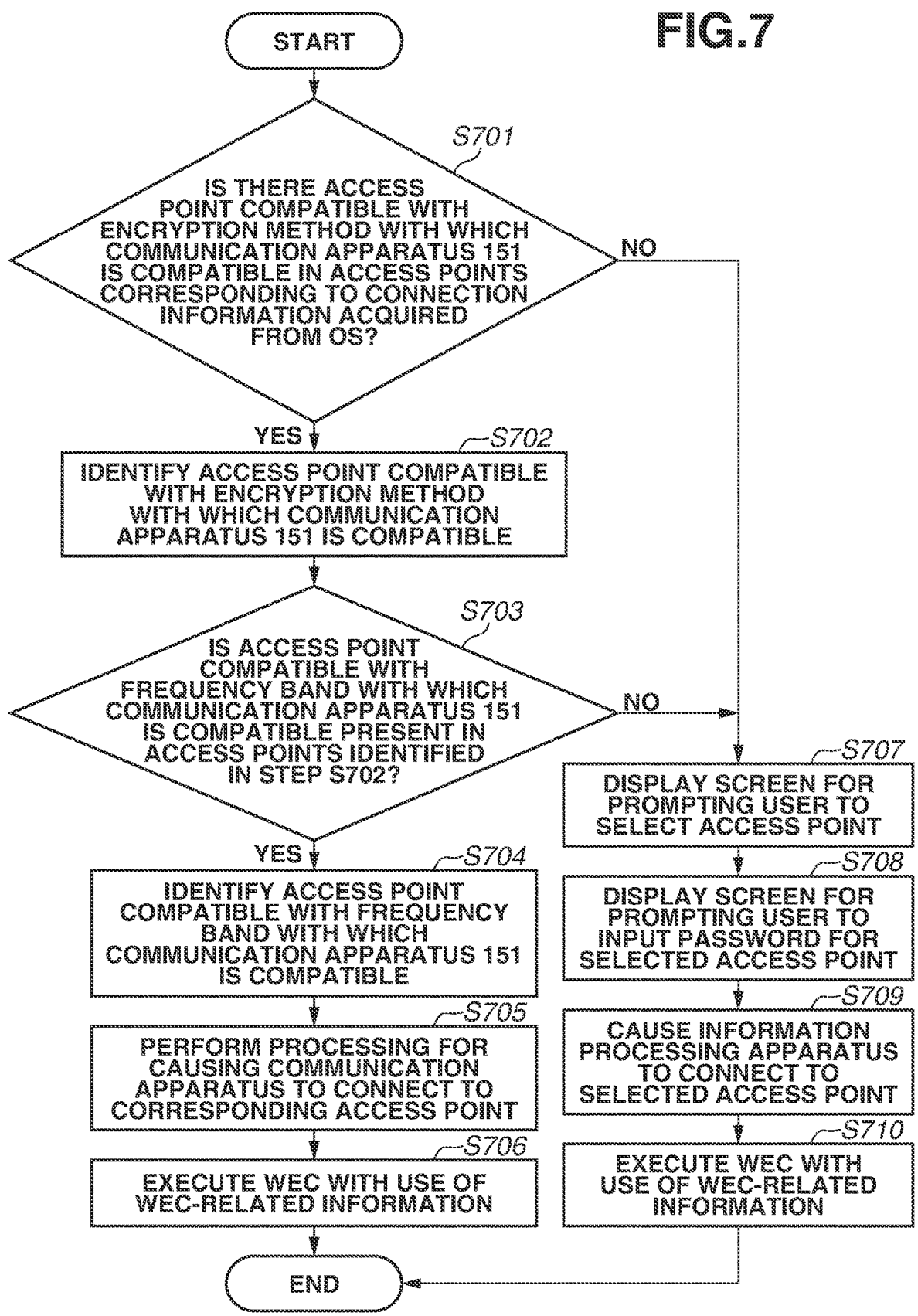

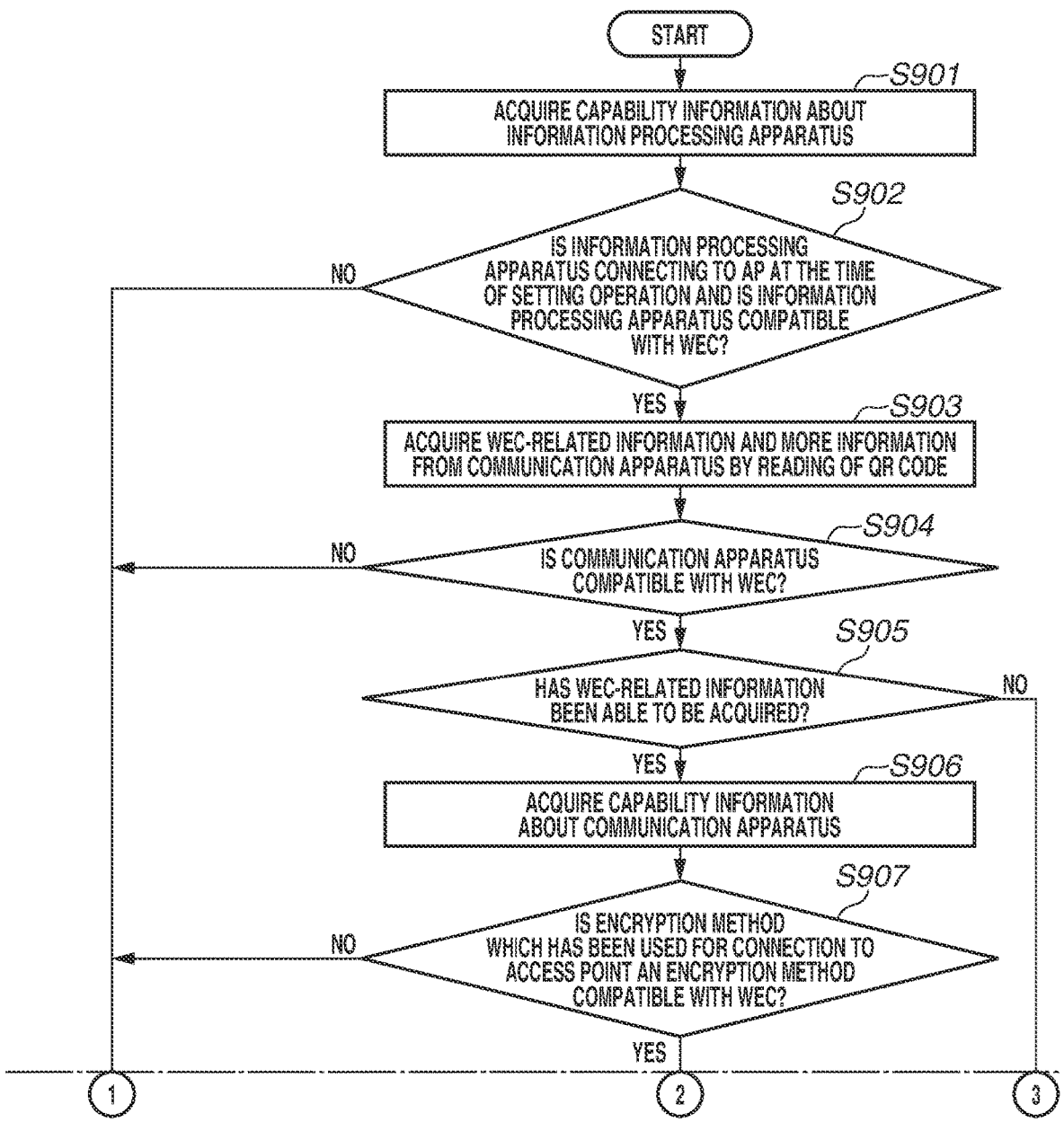

COMMUNICATION APPARATUS, CONTROL METHOD THEREFOR, AND STORAGE MEDIUM

BACKGROUND

Field

Aspects of the present disclosure generally relate to a communication apparatus, a control method therefor, and a storage medium.

Description of the Related Art

Japanese Patent Application Laid-Open No. 2016-127545 discusses a technique in which an information processing apparatus such as a personal computer (PC) transmits information about an access point (an external apparatus) to a communication apparatus such as a printer, thus causing the communication apparatus and the external apparatus to connect to each other.

Furthermore, with the popularization of a function of transmitting, to a communication apparatus, connection information for use in connecting to an access point—thereby allowing the communication apparatus and the access point to connect to each other, there is a demand for increasing the convenience of such a function.

SUMMARY

Various embodiments of the present disclosure are generally directed to increasing the convenience of a function of causing a communication apparatus and an access point to connect to each other.

According to one embodiment of the present disclosure, a method of an information processing apparatus that is configured to communicate with a communication apparatus is provided. The method is performed by causing a first application in a computer of the information processing apparatus to perform the method. The method includes receiving first information concerning the communication apparatus, displaying, based on it being determined that the communication apparatus is not able to connect to a first network based on the first information, information concerning a second network which is different from the first network and to which the communication apparatus is able to connect, based on the first information, and starting a second application which is an application different from the first application and which transmits, to the communication apparatus via a communication with the communication apparatus, connection information which is used for the communication apparatus to connect to any one of networks.

Further features of the present disclosure will become apparent from the following description of example embodiments with reference to the attached drawings.

BRIEF DESCRIPTION OF THE DRAWINGS

FIG. 1 is a diagram illustrating configurations of an information processing apparatus, a communication apparatus, and an access point.

FIG. 4 is a sequence diagram illustrating processing which is performed by the information processing apparatus and the communication apparatus.

FIG. 5 is a diagram illustrating an example of a Wi-Fi Easy Connect (WEC) start screen.

FIG. 6 is a sequence diagram illustrating processing which is performed by the information processing apparatus and the communication apparatus.

FIG. 7 is a flowchart illustrating the flow of processing which the information processing apparatus performs in network setup processing.

FIGS. 9A and 9B are flowcharts illustrating the flow of processing which the information processing apparatus performs in network setup processing.

DESCRIPTION OF THE EMBODIMENTS

Figure 2A:
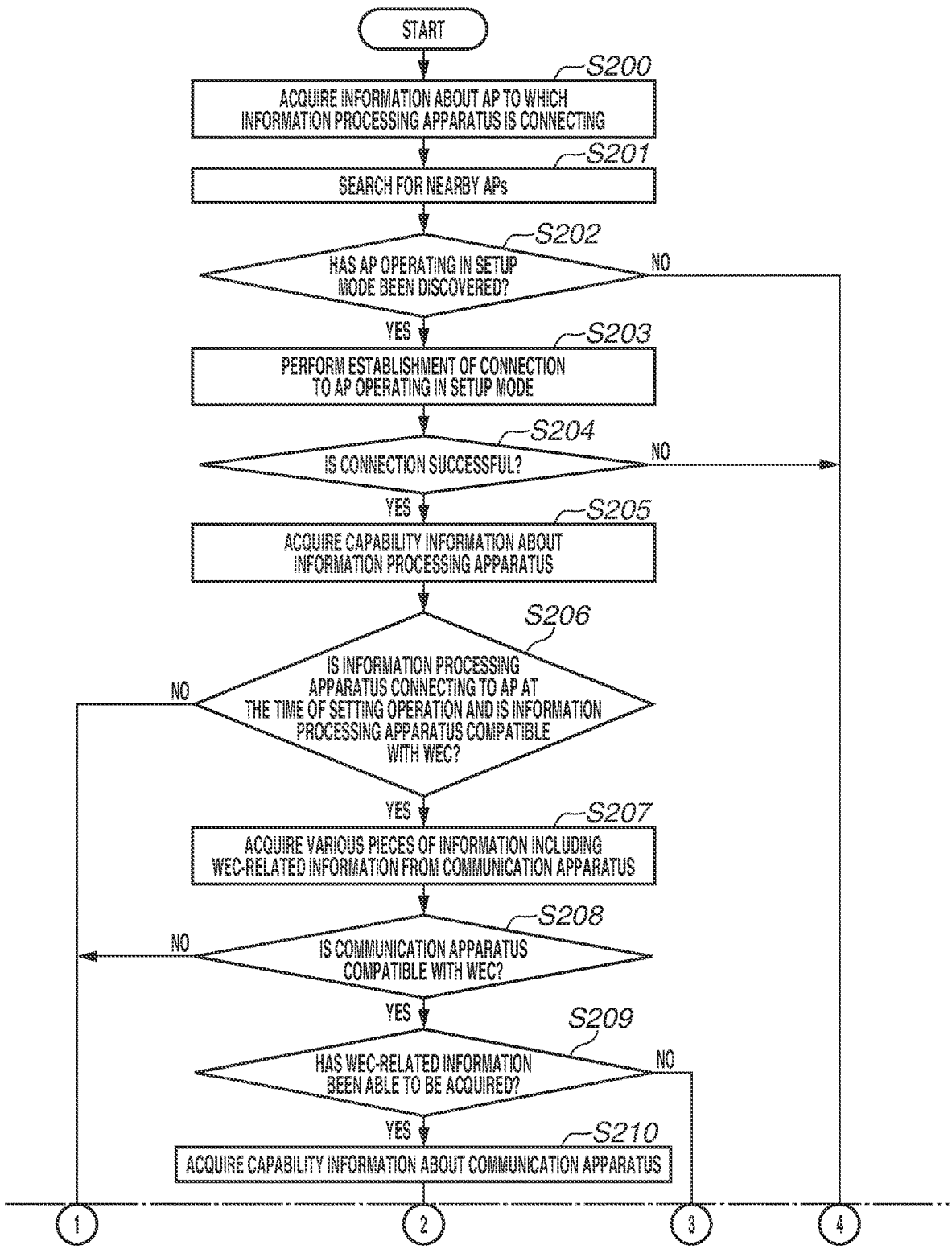
FIGS. 2A and 2B are flowcharts illustrating the flow of processing which the information processing apparatus performs in network setup processing.

Various example embodiments, features, and aspects of the present disclosure will be described in detail below with reference to the drawings. However, with regard to the present disclosure, it should be understood that configurations obtained by making modifications or improvements to example embodiments described below as appropriate based on the ordinary knowledge of a person skilled in the art within a range not departing from the gist of the present invention also fall within the scope of the present invention.

An information processing apparatus and a communication apparatus which are included in a communication system according to a first example embodiment of the present disclosure are described. While, in the first example embodiment, a smartphone is described as an example of the information processing apparatus, the first example embodiment is not limited to this. For example, various apparatuses, such as a mobile terminal, a personal computer (PC), a tablet terminal, a personal digital assistant (PDA), and a digital camera, can be applied as the information processing apparatus. Moreover, while, in the first example embodiment, a printer is described as an example of the communication apparatus, the first example embodiment is not limited to this, and various apparatuses can be applied as the communication apparatus, as long as those are capable of communicating with the information processing apparatus. For example, the applicable printer includes, for example, an inkjet printer, a full-color laser beam printer, and a monochrome printer. Moreover, not only a printer but also a copying machine, a facsimile apparatus, a portable terminal, a smartphone, a notebook PC, a tablet terminal, a PDA, a digital camera, a music playback device, a television set, or a smart speaker can be applied as the communication apparatus. Besides, a multifunction peripheral equipped with a plurality of functions including, for example, a copying function, a facsimile function, and a printing function can also be applied as the communication apparatus.

Moreover, in the first example embodiment, in a case where the information processing apparatus is compatible with a function called Wi-Fi Easy Connect™ (Wi-Fi CERTIFIED Easy Connect®) (WEC), the information processing apparatus is able to execute such a function. WEC is a function which performs network setup of another apparatus with use of Device Provisioning Protocol (DPP) formulated by the Wi-Fi Alliance. Furthermore, network setup of another apparatus is, specifically, processing for causing another apparatus to connect to an access point, which forms a network. In WEC, communications are performed between a device which operates in the role of "configurator" (hereinafter referred to as a "configurator device") and a device which operates in the role of "enrollee" (hereinafter referred to as an "enrollee device"). Furthermore, in the first example embodiment, the configurator device is assumed to be an initiator in the DPP, and the enrollee device is assumed to be a responder in the DPP. The configurator device acquires bootstrapping information from the enrollee device. The bootstrapping information includes, for example, identification information (e.g., media access control (MAC) address) about the enrollee device and public key information which is used to perform secure communications with the enrollee device. In the first example embodiment, the bootstrapping information is described as "WEC-related information". Furthermore, another piece of information can also be treated as WEC-related information. Then, the configurator device performs wireless communication with the enrollee device with use of the acquired bootstrapping information. Specifically, for example, the configurator device performs communication with the enrollee device with use of a public key included in the bootstrapping information. Additionally, the configurator device generates a common key based on the information obtained by such communication, and transmits information encrypted with use of the generated common key to the enrollee device. Furthermore, information to be transmitted here is, specifically, for example, connection information used for connecting to an access point. Then, the enrollee device establishes a wireless connection with an access point using the connection information received from the configurator device. Furthermore, in the description of network setup processing using WEC in the first example embodiment, an information processing apparatus compatible with WEC is assumed to operate as a configurator device and a communication apparatus compatible with WEC is assumed to operate as an enrollee device.

First, configurations of an information processing apparatus in the first example embodiment and a communication apparatus capable of communicating with the information processing apparatus in the first example embodiment are described with reference to the block diagram of FIG. 1. Moreover, while, in the first example embodiment, the following configurations are described as an example, the first example embodiment is directed to functions applicable with respect to an apparatus capable of communicating with the communication apparatus and should not be construed to limit functions thereof to those illustrated in FIG. 1.

An information processing apparatus 101 serves as the information processing apparatus in the first example embodiment. The information processing apparatus 101 includes, for example, an input interface 102, a central processing unit (CPU) 103, a read-only memory (ROM) 104, a random access memory (RAM) 105, an external storage device 106, an output interface 107, a display unit 108, a communication unit 110, and a short-range wireless communication unit 111. For example, the CPU 103, the ROM 104, and the RAM 105 are configured to form a computer of the information processing apparatus 101.

The input interface 102 is an interface for receiving a data input or an operation instruction from the user issued by an operation unit such as a keyboard 109 being operated. Furthermore, the operation unit can be, for example, a physical keyboard or physical buttons, or can be, for example, a software keyboard or software buttons which are displayed on the display unit 108. Thus, the input interface 102 can be configured to receive an input (operation) from the user via the display unit 108.

The CPU 103 is a system control unit, and controls the entire information processing apparatus 101.

The ROM 104 stores fixed data such as control programs, data tables, and a built-in operating system (OS) program, which the CPU 103 executes. In the first example embodiment, the control programs stored in the ROM 104 are used to perform software execution control, such as scheduling, task switching, and interrupt processing, under the control of the built-in OS stored in the ROM 104.

The RAM 105 is configured with, for example, a static random access memory (SRAM), which requires a backup power source. Furthermore, the RAM 105 causes data to be retained by a primary battery for data backup (not illustrated) and is, therefore, able to store important data, such as program control variables, without volatilizing such data. Moreover, a memory area for storing, for example, setting information about the information processing apparatus 101 or management data about the information processing apparatus 101 is also provided in the RAM 105. Moreover, the RAM 105 is also used as a main memory and a work memory for the CPU 103.

The external storage device 106 stores, for example, an application program for performing network setup of a communication apparatus 151 (hereinafter referred to as a "setting application") and a printing information generation program for generating printing information which is interpretable by the communication apparatus 151. The setting application is an application program for performing setting of an access point serving as a connection destination of the communication apparatus 151 with use of, for example, WEC. Furthermore, the setting application can be configured to further include a function other than the network setup function. For example, the setting application can be configured to further include a function for causing the communication apparatus 151 to perform printing, a function for causing an original set on the communication apparatus 151 to be scanned, or a function for checking the state of the communication apparatus 151. For example, the setting application is stored in the external storage device 106 by being installed from an external server by the Internet communication via the communication unit 110. Moreover, the external storage device 106 stores various programs, such as an information transmission and reception control program for performing transmission and reception between the information processing apparatus 101 and the communication apparatus 151, to which the information processing apparatus 101 is connecting via the communication unit 110, and various pieces of information which these programs use.

The output interface 107 is an interface which performs control for the display unit 108 to perform displaying of data and perform notification of the state of the information processing apparatus 101.

The display unit 108 is configured with, for example, a light-emitting diode (LED) or a liquid crystal display (LCD), and performs displaying of data and notification of the state of the information processing apparatus 101.

The communication unit 110 is a configuration which connects to apparatuses, such as the communication apparatus 151 and an access point 131, to perform data communication. For example, the communication unit 110 is able to connect to an access point (not illustrated) included in the communication apparatus 151. By the communication unit 110 and the access point included in the communication apparatus 151 connecting to each other, the information processing apparatus 101 and the communication apparatus 151 become able to communicate with each other. Furthermore, the communication unit 110 can be configured to directly communicate with the communication apparatus 151 via wireless communication, and can be configured to communicate with the communication apparatus 151 via an external device present outside of the information processing apparatus 101 or the communication apparatus 151. Furthermore, the external device includes an external access point (e.g., the access point 131) present outside of the information processing apparatus 101 and the communication apparatus 151 and a device which is other than an access point and is able to relay communication. In the first example embodiment, the wireless communication method which the communication unit 110 uses is assumed to be Wi-Fi® (Wireless Fidelity), which is a communication standard compliant with the IEEE 802.11 series. Then, the above-mentioned WEC is assumed to be executed by the communication unit 110 performing communication. Moreover, examples of the access point 131 include devices such as a wireless local area network (LAN) router. Furthermore, in the first example embodiment, a method in which the information processing apparatus 101 and the communication apparatus 151 directly connect to each other without via an access point is referred to as a "direct connection method". Moreover, a method in which the information processing apparatus 101 and the communication apparatus 151 connect to each other via an external access point is referred to as an "infrastructure connection method".

The short-range wireless communication unit 111 is a configuration which wirelessly connects to an apparatus such as the communication apparatus 151 at close range to perform data communication, and performs communication by a communication method different from that of the communication unit 110. The short-range wireless communication unit 111 is able to connect to, for example, a short-range wireless communication unit 157 included in the communication apparatus 151. Examples of the communication method which the short-range wireless communication unit 111 uses include Near Field Communication (NFC), Bluetooth® Classic, Bluetooth Low Energy (BLE), and Wi-Fi Aware.

In the first example embodiment, the information processing apparatus 101 executes WEC by the function of the OS of the information processing apparatus 101 based on an execution instruction for network setup processing issued by the setting application.

The communication apparatus 151 serves as a communication apparatus in the first example embodiment. The communication apparatus 151 includes, for example, a ROM 152, a RAM 153, a CPU 154, a print engine 155, a communication unit 156, and a short-range wireless communication unit 157. For example, the ROM 152, the RAM 153, and the CPU 154 are configured to form a computer of the communication apparatus 151.

The communication unit 156 includes, as an internal access point of the communication apparatus 151, an access point for connecting to an apparatus such as the information processing apparatus 101. Furthermore, the access point is able to connect to the communication unit 110 of the information processing apparatus 101. The communication unit 156 enabling the access point causes the communication apparatus 151 to operate as an access point. Furthermore, the communication unit 156 can wirelessly connect directly to the information processing apparatus 101 or can wirelessly connect to the information processing apparatus 101 via the access point 131. In the first example embodiment, the wireless communication method which the communication unit 156 uses is assumed to be a communication standard compliant with the IEEE 802.11 series. Moreover, in the following description, Wi-Fi® (Wireless Fidelity) (Wi-Fi communication) is a communication standard compliant with the IEEE 802.11 series. Moreover, if the communication apparatus 151 is compatible with WEC, the above-mentioned WEC is assumed to be executed by the communication unit 156 performing communication. Moreover, the communication unit 156 can include hardware operating as an access point, or can operate as an access point by software for causing the communication unit 156 to operate as an access point.

The communication apparatus 151 in the first example embodiment is able to operate in an infrastructure mode and a peer to peer (P2P) mode, which are modes (states) for performing communication using the communication unit 156.

The infrastructure mode is a form in which the communication apparatus 151 performs communication with another apparatus such as the information processing apparatus 101 via an external device (e.g., the access point 131) forming a network. A connection to an external access point which is established by the communication apparatus 151 operating in the infrastructure mode is referred to as "infrastructure connection". In the first example embodiment, in the infrastructure connection, the communication apparatus 151 operates as a slave station and the external access point operates as a master station. Furthermore, in the first example embodiment, the master station is a device which determines a communication channel for use in a network to which the master station belongs, and the slave station is a device which does not determine a communication channel for use in a network to which the slave station belongs but uses the communication channel which the master station has determined.

The P2P mode is a form in which the communication apparatus 151 directly communicates with another apparatus such as the information processing apparatus 101 without via an external device forming a network. In the first example embodiment, the P2P mode is assumed to include an access point (AP) mode in which the communication apparatus 151 operates as an access point. Connection information (a service set identifier (SSID) or a password) about an access point which is enabled within the communication apparatus 151 in the AP mode is assumed to be optionally settable by the user. Furthermore, the P2P mode can include, for example, a Wi-Fi Direct (WFD) mode for the communication apparatus 151 to perform communication by Wi-Fi Direct (WFD). Furthermore, which of a plurality of WFD-compatible devices operates as a master station is determined according to, for example, a sequence called "group owner negotiation". Furthermore, a master station can be determined without the group owner negotiation being performed. An apparatus which is a WFD-compatible device and functions as a master station is particularly referred to as a "group owner". A direct contact with another apparatus which is established by the communication apparatus 151 operating in the P2P mode is referred to as "direct connection". In the first example embodiment, in the direct connection, the communication apparatus 151 operates as a master station and another apparatus operates as a slave station.

Moreover, in the first example embodiment, the communication apparatus 151 is able to operate in a network setup mode, which is a mode for performing network setup of the communication apparatus 151, in response to receiving a predetermined operation from the user. When operating in the network setup mode, the communication apparatus 151 uses the communication unit 156 to operate as an access point for setup which is enabled during the process of operating in the network setup mode. The access point for setup is an access point different from an access point which is enabled during the above-mentioned AP mode. Moreover, the SSID of the access point for setup is assumed to include a predetermined character string which is recognizable by the setting application of the information processing apparatus 101.

Moreover, the access point for setup is assumed to be an access point which does not require a password for connection. Moreover, the communication apparatus 151 operating in the network setup mode is assumed to use a predetermined communication protocol (a communication protocol for setup) in performing a communication with the information processing apparatus 101 connecting to the access point for setup. Specifically, the communication protocol for setup is, for example, Simple Network Management Protocol (SNMP). After starting an operation in the network setup mode, the communication apparatus 151 stops an operation in the network setup mode, thus disabling the access point for setup, when a predetermined time has elapsed. This is because, since the access point for setup is an access point which does not require a password as mentioned above, if the access point for setup is enabled for a long time, the possibility of receiving a request for connection from an inappropriate apparatus may increase. Furthermore, the access point for setup can be an access point which requires a password. In that case, a password for use in connection with the access point for setup is assumed to be a fixed (unchangeable by the user) password which the setting application previously recognizes.

Moreover, in the first example embodiment, the communication apparatus 151 is able to also operate in a mode for performing network setup of the communication apparatus 151 by a communication protocol different from the protocol for setup in response to receiving a predetermined operation from the user. In the first example embodiment, the communication protocol different from the protocol for setup is assumed to be the above-mentioned DPP, and the mode for performing network setup of the communication apparatus 151 using the DPP is referred to as a "DPP awaiting mode". In a case where a network setup request using the DPP has been received from the information processing apparatus 101 in a state in which the communication apparatus 151 is operating in the DPP awaiting mode, the communication apparatus 151 performs network setup using the DPP. Therefore, the DPP awaiting mode is, in other words, a mode in which the communication apparatus 151 is awaiting a network setup request using the DPP.

The short-range wireless communication unit 157 is a configuration which wirelessly connects to an apparatus such as the information processing apparatus 101 at close range, and is able to connect to, for example, the short-range wireless communication unit 111 included in the information processing apparatus 101. Examples of the communication method which the short-range wireless communication unit 157 uses include NFC, Bluetooth® Classic, BLE, and Wi-Fi Aware.

The RAM 153 is configured with, for example, an SRAM, which requires a backup power source. Furthermore, the RAM 153 causes data to be retained by a primary battery for data backup (not illustrated) and is, therefore, able to store important data, such as program control variables, without volatilizing such data. Moreover, a memory area for storing, for example, setting information about the communication apparatus 151 or management data about the communication apparatus 151 is also provided in the RAM 153. Moreover, the RAM 153 is also used as a main memory and a work memory for the CPU 154, and serves as a receive buffer for temporarily storing printing information received from, for example, the information processing apparatus 101 and stores various pieces of information.

The ROM 152 stores fixed data such as control programs, data tables, and an OS program, which the CPU 154 executes. In the first example embodiment, the control programs stored in the ROM 152 are used to perform software execution control, such as scheduling, task switching, and interrupt processing, under the control of the built-in OS stored in the ROM 152.

The CPU 154 is a system control unit, and controls the entire communication apparatus 151.

The print engine 155 forms an image on a recording medium such as paper by applying a recording agent such as ink to the recording medium based on information stored in the RAM 153 or a print job received from, for example, the information processing apparatus 101, and thus outputs a print result. Furthermore, since, generally, the amount of data of a print job transmitted from, for example, the information processing apparatus 101 is large, the communication for a print job requires using a communication method capable of performing high-speed communication. Therefore, the communication apparatus 151 receives a print job via the communication unit 156, which is capable of performing higher-speed communication than the short-range wireless communication unit 157.

Furthermore, a memory, such as an external hard disk drive (HDD) or a Secure Digital (SD) card, can be mounted as an optional device on the communication apparatus 151, and information to be stored in the communication apparatus 151 can be stored in such a memory.

An input interface 158 is an interface for receiving a data input or an operation instruction from the user issued by an operation unit 159 such as physical buttons being operated. Furthermore, the operation unit can be, for example, a software keyboard or software buttons which are displayed on a display unit 161.

Thus, the input interface 158 can be configured to receive an input from the user via the display unit 161.

An output interface 160 is an interface which performs control for the display unit 161 to perform displaying of data and perform notification of the state of the communication apparatus 151.

The display unit 161 is configured with, for example, a light-emitting diode (LED) or a liquid crystal display (LCD), and performs displaying of data and notification of the state of the communication apparatus 151.

Figure 2B:
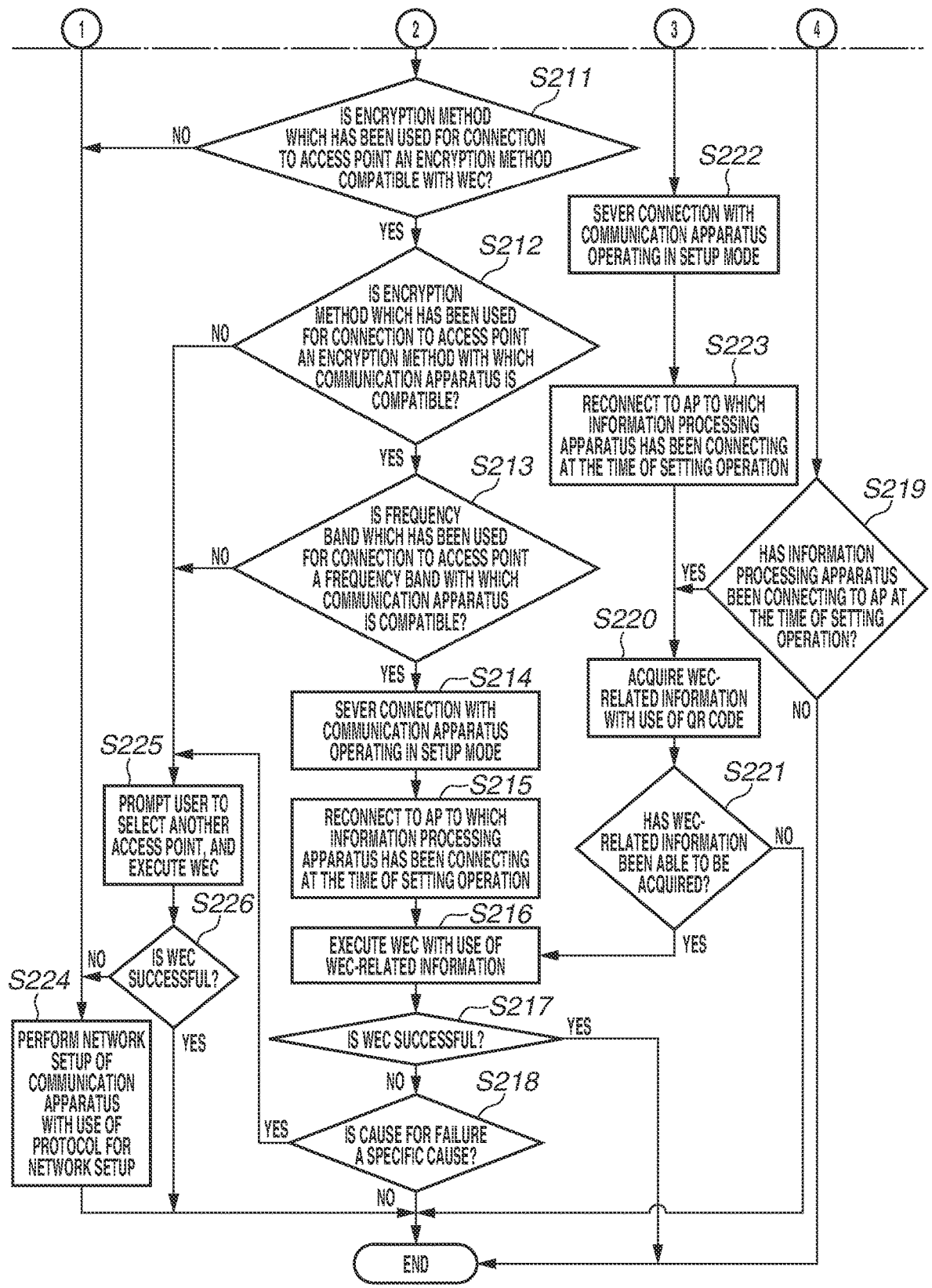

FIGS. 2A and 2B are flowcharts illustrating the flow of processing which the information processing apparatus 101 performs in the network setup processing in the first example embodiment. The flowcharts of FIGS. 2A and 2B are implemented by, for example, the CPU 103 reading out a setting application stored in, for example, the ROM 104 or the external storage device 106 onto the RAM 105 and executing the setting application. Moreover, the flowcharts of FIGS. 2A and 2B are started in response to a predetermined operation for network setup (hereinafter referred to as a "setting operation") being performed in a screen which the setting application displays.

First, in step S200, the CPU 103 acquires information about an access point to which the information processing apparatus 101 has been connecting by Wi-Fi at least when the setting operation has been performed (hereinafter referred to as a "connected AP"). Furthermore, in the first example embodiment, since, after the setting operation has been performed, the information processing apparatus 101 is not performing switching of an access point serving as a connection destination, the access point is also an access point to which the information processing apparatus 101 is currently connecting in step S200. The information to be acquired includes information for connecting to an access point to which the information processing apparatus 101 is wirelessly connecting by Wi-Fi (e.g., an SSID or information indicating an encryption method). Furthermore, the acquired information is then stored in a predetermined storage region of a memory included in the information processing apparatus 101. Furthermore, in a case where, when the setting operation has been performed, the information processing apparatus 101 is not connecting to any access point by Wi-Fi, the present processing is omitted.

Next, in step S201, the CPU 103 instructs the OS of the information processing apparatus 101 to search for access points near the information processing apparatus 101, and acquires a result of the search from the setting application.

Next, in step S202, the CPU 103 determines whether an access point which is enabled by the communication apparatus 151 operating in the network setup mode is present in the search result acquired in step S201. As mentioned above, in the first example embodiment, the SSID of an access point which is enabled by the communication apparatus 151 operating in the network setup mode includes a predetermined character string previously recognized by the setting application. Therefore, in the present determination, specifically, the CPU 103 determines whether an access point having an SSID including the predetermined character string is present in the search result acquired in step S201. If the result of determination in step S202 is yes (YES in step S202), the CPU 103 advances the processing to step S203, and, if the result of determination in step S202 is no (NO in step S202), the CPU 103 advances the processing to step S219.

In step S203, the CPU 103 tries to establish a Wi-Fi connection between the access point which is enabled by the communication apparatus 151 operating in the network setup mode, included in the search result, and the information processing apparatus 101. Furthermore, the Wi-Fi connection to be established is equivalent to a Wi-Fi connection between the communication apparatus 151 operating in the network setup mode and the information processing apparatus 101.

Next, in step S204, the CPU 103 determines whether the establishment of the Wi-Fi connection in step S203 is successful. If the result of determination in step S204 is yes (YES in step S204), the CPU 103 advances the processing to step S205, and, if the result of determination in step S204 is no (NO in step S204), the CPU 103 advances the processing to step S219.

In step S205, the CPU 103 acquires capability information about the information processing apparatus 101 from the OS. In the first example embodiment, the capability information includes information indicating whether the information processing apparatus 101 is compatible with WEC. Furthermore, the content of capability information differs depending on, for example, the model or model number of the information processing apparatus 101.

Next, in step S206, the CPU 103 determines whether the information processing apparatus 101 is connecting to an access point by Wi-Fi when the setting operation has been performed and the information processing apparatus 101 is compatible with WEC. Here, for example, in a case where the information processing apparatus 101 is not connecting to an access point by Wi-Fi when the setting operation has been performed, the result of determination becomes no. Moreover, for example, in a case where, while the information processing apparatus 101 is connecting to an access point by Wi-Fi when the setting operation has been performed, the information processing apparatus 101 is not compatible with WEC, the result of determination becomes no. Furthermore, whether the information processing apparatus 101 is connecting to an access point by Wi-Fi when the setting operation has been performed is determined based on whether information about the connected AP is currently stored in the above-mentioned predetermined storage region. Moreover, whether the information processing apparatus 101 is compatible with WEC is determined based on the content of capability information acquired in step S205. If the result of determination in step S206 is yes (YES in step S206), the CPU 103 advances the processing to step S207, and, if the result of determination in step S206 is no (NO in step S206), the CPU 103 advances the processing to step S224.

In step S207, the CPU 103 tries to acquire various pieces of information from the communication apparatus 151 via a Wi-Fi connection between the access point which is enabled by the communication apparatus 151 operating in the network setup mode and the information processing apparatus 101. Furthermore, as mentioned above, in a communication performed via a Wi-Fi connection between the access point which is enabled by the communication apparatus 151 operating in the network setup mode and the information processing apparatus 101, a communication protocol for setup is used. Moreover, the information to be acquired here includes, for example, the above-mentioned WEC-related information and information indicating whether the communication apparatus 151 is compatible with WEC. Furthermore, the information indicating whether the communication apparatus 151 is compatible with WEC is information indicating whether the communication apparatus 151 is compatible with the DPP. Furthermore, in a case where the communication apparatus 151 is not compatible with WEC, information indicating that the communication apparatus 151 is not compatible with WEC is acquired, so that WEC-related information is not acquired. Moreover, in a case where the communication apparatus 151 is not compatible with WEC, neither WEC-related information nor information indicating whether the communication apparatus 151 is compatible with WEC may be acquired. Generally, WEC-related information can be acquired by the communication apparatus 151 displaying a QR code corresponding to the WEC-related information on a display unit and the information processing apparatus 101 reading the QR code with, for example, a camera unit. However, in the first example embodiment, WEC-related information is acquired via a Wi-Fi connection between the access point which is enabled by the communication apparatus 151 operating in the network setup mode and the information processing apparatus 101. With this configuration, even if the communication apparatus 151 does not have a display unit for displaying a QR code or the information processing apparatus 101 does not have a camera unit for reading a QR code, the CPU 103 is able to cause the information processing apparatus 101 to acquire WEC-related information.

Next, in step S208, the CPU 103 determines whether the communication apparatus 151 is compatible with WEC, based on the information acquired in step S207. The communication apparatus 151 being compatible with WEC means the communication apparatus 151 being compatible with the above-mentioned DPP. In a case where information indicating that the communication apparatus 151 is compatible with WEC has been acquired, the result of determination becomes yes, and, in a case where information indicating that the communication apparatus 151 is compatible with WEC has not been acquired, the result of determination becomes no. If the result of determination in step S208 is yes (YES in step S208), the CPU 103 advances the processing to step S209, and, if the result of determination in step S208 is no (NO in step S208), the CPU 103 advances the processing to step S224. Furthermore, in a case where information has not been acquired in step S207, the result of determination in step S208 becomes no.

Next, in step S209, the CPU 103 determines whether WEC-related information has been able to be acquired from the communication apparatus 151 in step S207. If the result of determination in step S209 is yes (YES in step S209), the CPU 103 advances the processing to step S210, and, if the result of determination in step S209 is no (NO in step S209), the CPU 103 advances the processing to step S222. Furthermore, a case where the result of determination in step S209 becomes no is, for example, a case where, while information indicating that the communication apparatus 151 is compatible with WEC has been acquired, WEC-related information has not been acquired due to, for example, a communication error.

In step S210, the CPU 103 acquires capability information about the communication apparatus 151 via a Wi-Fi connection between the access point which is enabled by the communication apparatus 151 operating in the network setup mode and the information processing apparatus 101. In the first example embodiment, the capability information about the communication apparatus 151 is assumed to include at least one of information indicating an encryption method with which the communication apparatus 151 is compatible or information indicating a frequency band with which the communication apparatus 151 is compatible. The encryption method with which the communication apparatus 151 is compatible is, for example, Wi-Fi Protected Access (WPA), Wi-Fi Protected Access II (WPA2), or Wi-Fi Protected Access 3 (WPA3). Moreover, the information indicating a frequency band with which the communication apparatus 151 is compatible can be information indicating a communication channel corresponding to a frequency band with which the communication apparatus 151 is compatible (channel information). Furthermore, in a configuration in which, as described below, a determination concerning an encryption method with which the communication apparatus 151 is compatible or a determination concerning a frequency band with which the communication apparatus 151 is compatible is not performed, the present processing can be omitted. Furthermore, the capability information can be previously included in the setting application. Thus, the CPU 103 can specify capability information corresponding to the communication apparatus 151 from among a plurality of pieces of capability information prepared for each type or model number of each communication apparatus previously included in the setting application, and acquire the specified capability information from the setting application.

Next, in step S211, the CPU 103 determines whether the encryption method which has been used for connection to the connected AP is an encryption method compatible with WEC (compatible with the DPP). Furthermore, the encryption method compatible with WEC is, for example, WPA2 or WPA3, and the encryption method incompatible with WEC is, for example, WPA or WEP. Furthermore, the CPU 103 can recognize which is the encryption method compatible with WEC, based on information which the setting application previously retains or based on information which is acquired from the communication apparatus 151. If the result of determination in step S211 is yes (YES in step S211), the CPU 103 advances the processing to step S212, and, if the result of determination in step S211 is no (NO in step S211), the CPU 103 advances the processing to step S224. Furthermore, the present determination can be performed at different timing. Specifically, for example, the present determination can be performed after the result of determination in step S204 is yes, and, if the result of determination is yes, the CPU 103 can advance the processing to step S205 and, if the result of determination is no, the CPU 103 can advance the processing to step S224.

Next, in step S212, the CPU 103 determines whether the encryption method which has been used for connection to the connected AP is an encryption method with which the communication apparatus 151 is compatible, based on the capability information acquired in step S210. Furthermore, in the first example embodiment, the encryption method with which the communication apparatus 151 is compatible is WPA, WPA2, or WPA3, and the encryption method with which the communication apparatus 151 is not compatible is Wired Equivalent Privacy (WEP). If the result of determination in step S212 is yes (YES in step S212), the CPU 103 advances the processing to step S213, and, if the result of determination in step S212 is no (NO in step S212), the CPU 103 advances the processing to step S225.

Next, in step S213, the CPU 103 determines whether the frequency band which has been used for connection to the connected AP is a frequency band with which the communication apparatus 151 is compatible, based on the capability information acquired in step S210. Furthermore, in the first example embodiment, the communication apparatus 151 is assumed to include a type which is compatible with both a frequency band of 2.4 gigahertz (GHz) and a frequency band of 5 GHz and a type which is compatible with a frequency band of 2.4 GHz but is not compatible with a frequency band of 5 GHz. Then, the communication apparatus 151 is not able to connect to an access point depending on a frequency band with which the communication apparatus 151 is not compatible. Therefore, for example, in a case where the frequency band which has been used for connection to the connected AP is a frequency band of 5 GHz and the communication apparatus 151 is not compatible with a frequency band of 5 GHz, the result of determination in step S213 becomes no. If the result of determination in step S213 is yes (YES in step S213), the CPU 103 advances the processing to step S214, and, if the result of determination in step S213 is no (NO in step S213), the CPU 103 advances the processing to step S225.

In step S214, the CPU 103 severs a Wi-Fi connection between the access point which is enabled by the communication apparatus 151 operating in the network setup mode and the information processing apparatus 101.

Next, in step S215, the CPU 103 re-establishes a connection between the access point to which the information processing apparatus 101 has been connecting by Wi-Fi when the setting operation has been performed and the information processing apparatus 101. Furthermore, in WEC, information about an access point to which the information processing apparatus 101 is connecting during execution of WEC is transmitted. Therefore, the present processing is performed in preparation for execution of WEC in step S216.

Next, in step S216, the CPU 103 performs processing for executing WEC with use of the acquired WEC-related information. Furthermore, in the first example embodiment, the setting application does not directly execute WEC but performs processing for starting an application program for WEC (hereinafter referred to as an "WEC application")

included as standard in the OS as processing for executing WEC. Then, the API for WEC is executed by the WEC application and, thus, an execution request for WEC is made to the OS, so that WEC is executed by the OS. Furthermore, the API for WEC can be executed by the setting application and, thus, an execution request for WEC can be made to the OS, and processing for executing WEC can be the execution request. The details of the present processing are described below.

In step S217, the CPU 103 determines whether the establishment of a connection between the access point and the communication apparatus 151 is successful, by the executed WEC. The present determination is performed based on information indicating the success or failure of a connection with the access point, acquired from the communication apparatus 151. Furthermore, the CPU 103 can search for the communication apparatus 151 on a network which the connected AP forms and, if the communication apparatus 151 has been found, the CPU 103 can determine that WEC is successful. If the result of determination in step S217 is yes (YES in step S217), the CPU 103 ends the processing, and, if the result of determination in step S217 is no (NO in step S217), the CPU 103 advances the processing to step S218.

In step S218, the CPU 103 determines whether a cause for the establishment of a connection between the access point and the communication apparatus 151 having been unsuccessful is a specific cause, by the executed WEC. Furthermore, in the first example embodiment, information about a cause for the establishment of a connection between the access point and the communication apparatus 151 having been unsuccessful is assumed to be acquired from the communication apparatus 151 by the executed WEC, and the present determination is assumed to be performed based on the acquired information. Moreover, in the first example embodiment, the specific cause is, for example, an error having occurred in a communication in WEC (cause 1).

Moreover, for example, the specific cause is an encryption method used for connection between the information processing apparatus 101 and the access point being an encryption method with which the communication apparatus 151 is not compatible (cause 2). Moreover, for example, the specific cause is a frequency band used for connection between the information processing apparatus 101 and the access point being a frequency band with which the communication apparatus 151 is not compatible (cause 3). Furthermore, a failure resulting from the cause 2 or cause 3 may occur in a case where WEC has been executed after the result of determination in step S221 is yes. This is because, in a case where WEC is executed after the result of determination in step S221 is yes, unlike a case where WEC is executed after step S215, capability information about the communication apparatus 151 has not yet been acquired and the determination such as that in step S212 or step S213 has not been performed. If the result of determination in step S218 is yes (YES in step S218), the CPU 103 advances the processing to step S225, and, if the result of determination in step S218 is no (NO in step S218), the CPU 103 ends the processing. Furthermore, if the result of determination in step S218 is yes, the CPU 103 can advance the processing to step S224.

Furthermore, processing in step S217 or step S218 can be omitted. Specifically, for example, after step S216, processing can be ended without step S217 or step S218 being performed. Moreover, in a case where the result of determination in step S217 is no, processing can be ended without step S218 being performed.

Next, step S219, which is performed if the result of determination in step S202 is no or if the result of determination in step S204 is no, is described. In step S219, the CPU 103 determines whether the information processing apparatus 101 has been connecting to an access point by Wi-Fi when the setting operation has been performed. The present determination is performed based on whether information concerning an access point is currently stored in the above-mentioned predetermined storage region. If the result of determination in step S219 is yes (YES in step S219), the CPU 103 advances the processing to step S220, and, if the result of determination in step S219 is no (NO in step S219), the CPU 103 ends the processing.

Figure 3:
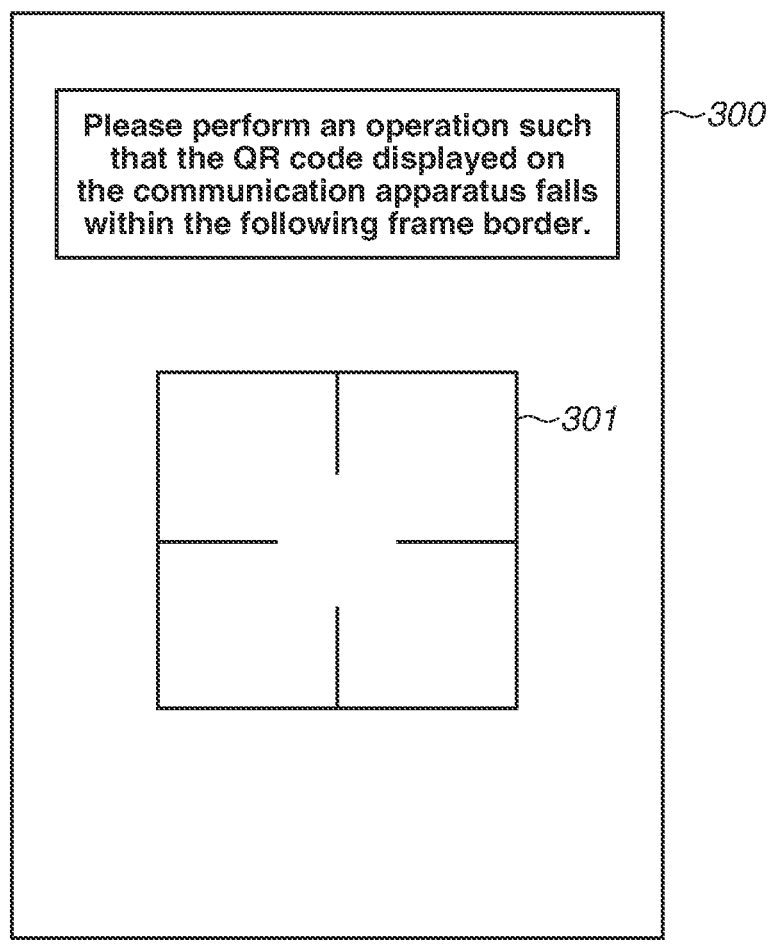
FIG. 3 is a diagram illustrating an example of a screen for QR code® image capturing, which a setting application displays.

In step S220, the CPU 103 tries to acquire WEC-related information by a method different from the acquisition method for WEC-related information used in step S207. Specifically, for example, the CPU 103 tries to acquire WEC-related information by the above-mentioned image capturing and reading of a QR code. FIG. 3 illustrates an example of a screen for QR code image capturing which the setting application displays. In the screen 300 for QR code image capturing, a frame 301 is displayed and, additionally, in the screen 300, an image which is being captured by a camera unit included in the information processing apparatus 101 is displayed. The user operates the information processing apparatus 101 in such a manner that a QR code which is being captured by the camera unit and which the communication apparatus 151 displays falls within the frame 301. In a case where it is detected that the QR code has fallen within the frame 301, the CPU 103 analyzes the QR code and thus acquires WEC-related information. Furthermore, the acquisition of WEC-related information is not limited to this configuration, and, for example, the CPU 103 can acquire WEC-related information from the communication apparatus 151 by Near-field communication (NFC) or Bluetooth Low Energy (BLE). Furthermore, in a case where the communication apparatus 151 is not compatible with WEC, the communication apparatus 151 is not able to perform displaying of a QR code or transmission of WEC-related information by NFC or BLE. In that case, the CPU 103 ends the processing in response to receiving a cancel operation on the setting application from the user. Furthermore, the screen 300 for QR code image capturing can be displayed by an application program other than the setting application (for example, an WEC application or another application program for image capturing).

Next, in step S221, the CPU 103 determines whether WEC-related information has been able to be acquired in step S220.

If the result of determination in step S221 is yes (YES in step S221), the CPU 103 advances the processing to step S216, and, if the result of determination in step S221 is no (NO in step S221), the CPU 103 ends the processing. Furthermore, for example, in a case where the QR code read in step S220 is not a QR code for causing WEC-related information to be acquired or in a case where reading of the QR code is failed, the result of determination in step S221 becomes no. Moreover, in a case where the result of determination in step S221 is no, the CPU 103 can be configured not to end the processing but to advance the processing to step S224. Moreover, in a case where the result of determination in step S221 is yes, the CPU 103 can determine whether the encryption method which has been used for connection to the connected AP is an encryption method compatible with WEC (compatible with the DPP). Then, if the result of determination in step S221 is yes, the CPU 103 can advance the processing to step S216, and, if the result of determination in step S221 is no, the CPU 103 can end the processing or can advance the processing to step S224. Furthermore, in this case, it is assumed that the CPU 103 is aware of which is an encryption method compatible with WEC, based on information previously retained by the setting application.

Next, step S222, which is performed in a case where the result of determination in step S209 is no, is described. In step S222, the CPU 103 severs a Wi-Fi connection between the access point which is enabled by the communication apparatus 151 operating in the network setup mode and the information processing apparatus 101.

Next, in step S223, the CPU 103 re-establishes a connection between the access point to which the information processing apparatus 101 has been connecting by Wi-Fi when the setting operation has been performed and the information processing apparatus 101. After that, the CPU 103 advances the processing to step S220 described above.

In this way, in the first example embodiment, in a case where WEC-related information is not able to be acquired by a Wi-Fi connection between the communication apparatus 151 operating in the network setup mode and the information processing apparatus 101, the CPU 103 tries to acquire WEC-related information by another method. Specifically, for example, the CPU 103 tries to acquire WEC-related information by reading of a QR code. With this processing, even in a case where WEC-related information is not able to be acquired by a Wi-Fi connection between the communication apparatus 151 operating in the network setup mode and the information processing apparatus 101, the CPU 103 is able to execute WEC.

Next, step S224, which is performed in a case where the result of determination in step S206 is no, in a case where the result of determination in step S208 is no, or in a case where the result of determination in step S211 is no, is described. In step S224, the CPU 103 performs network setup of the communication apparatus 151 by a method different from WEC. In the first example embodiment, the method different from WEC is a method of performing network setup of the communication apparatus 151 with use of a communication protocol for setup, which is a protocol different from the protocol for WEC (the DPP). The details of the present processing are described below with reference to FIG. 6. After that, the CPU 103 ends the processing.

Additionally, step S225, which is performed in a case where the result of determination in step S212 is no, in a case where the result of determination in step S213 is no, or in a case where the result of determination in step S218 is yes, is described. In step S225, to transmit connection information about another access point different from the connected AP to the communication apparatus 151, the CPU 103 executes WEC. Accordingly, in execution of WEC in step S225 described below, information concerning another access point different from the connected AP is transmitted. The details of the present processing are described below with reference to FIG. 7.

In step S226, the CPU 103 determines whether the establishment of a connection between the access point and the communication apparatus 151 is successful, by WEC executed in step S225. The present determination is performed based on information indicating whether execution of WEC has been cancelled or information indicating the success or failure of a connection with the access point, acquired from the communication apparatus 151. If the result of determination in step S226 is yes (YES in step S226), the CPU 103 ends the processing, and, if the result of determination in step S226 is no (NO in step S226), the CPU 103 advances the processing to step S224. Furthermore, if the result of determination in step S226 is no, the CPU 103 can end the processing. Furthermore, the case where the establishment of a connection between the access point and the communication apparatus 151 is failed by WEC executed in step S225 is, for example, a case where an error has occurred in a communication in WEC. Moreover, for example, the case where the establishment of a connection between the access point and the communication apparatus 151 is failed is a case where the communication apparatus 151 is not able to connect to an access point different from the connected AP, selected in step S225. The case where the communication apparatus 151 is not able to connect to an access point different from the connected AP, selected in step S225, is a case where such an access point is not present near the communication apparatus 151 and, therefore, the CPU 103 is not able to perform network setup.

Furthermore, the content of processing in the above-described flowchart is not limited to the above-described content. For example, in a case where WEC-related information is not able to be acquired by a Wi-Fi connection between the communication apparatus 151 operating in the network setup mode and the information processing apparatus 101, the CPU 103 can end the processing without trying to acquire WEC-related information by another method. The case where WEC-related information is not able to be acquired by a Wi-Fi connection between the communication apparatus 151 operating in the network setup mode and the information processing apparatus 101 is, specifically, for example, a case where the result of determination in step S202 is no, a case where the result of determination in step S204 is no, or a case where the result of determination in step S209 is no. Thus, in a case where the result of determination in step S202 is no, in a case where the result of determination in step S204 is no, or in a case where the result of determination in step S209 is no, the CPU 103 can end the processing without performing subsequent processing (step S219 to step S223).

Moreover, for example, while, in the above description, two determinations in step S208 and step S209 are performed after step S207, the first example embodiment is not limited to this configuration. For example, after step S207, instead of two determinations in step S208 and step S209, a determination as to whether WEC-related information has been acquired can be performed. Then, if the result of determination is yes, the CPU 103 can advance the processing to step S210, and, if the result of determination is no, the CPU 103 can advance the processing to step S224, so that a configuration in which processing in step S220 to step S223 is not performed can be employed.

Furthermore, in the first example embodiment, an encryption method compatible with WEC is included in encryption methods with which the communication apparatus 151 is compatible. Therefore, a configuration in which the determination in step S211 is not performed can be employed. Specifically, for example, after step S210, without the determination in step S211 being performed, the determination in step S212 can be performed.

Moreover, for example, a configuration in which an encryption method with which the communication apparatus 151 is compatible is included in encryption methods compatible with WEC, such as a configuration in which the encryption method with which the communication apparatus 151 is compatible is only WPA3 and the encryption methods compatible with WEC are WPA2 and WPA3, can be employed. In that case, a configuration in which the determination in step S211 is not performed can be employed.

Next, processing which is performed by the information processing apparatus 101 and the communication apparatus 151 in step S216 is described with reference to FIG. 4. The sequence illustrated in FIG. 4 is implemented by, for example, a CPU of each apparatus reading out a program stored in, for example, a ROM of each apparatus or an external storage device onto a RAM of each apparatus and executing the program.

First, in step S400, the information processing apparatus 101 starts WEC using the DPP by the function of the OS. Specifically, first, the information processing apparatus 101 issues a starting instruction for the WEC application from the setting application to the OS, thus starting the WEC application. This causes the WEC application to operate in the foreground and causes the setting application to operate in the background. Furthermore, for example, execution of the starting instruction is equivalent to an instruction for executing WEC.

With this processing, the information processing apparatus 101 displays a WEC start screen using the WEC application. Furthermore, the WEC application is a program which is previously installed on the information processing apparatus 101 and is a program which is provided by the OS vendor of the information processing apparatus 101. Moreover, in a case where the WEC application has been started, the WEC-related information acquired by the setting application is provided to the WEC application. FIG. 5 illustrates an example of a WEC start screen which is displayed by the WEC application. The WEC start screen 500 has areas 501, 502, and 503 displayed therein.

The area 501 is an area for changing an access point which is set as a setting target using WEC. Furthermore, before the area 501 is operated, the access point which is set as a setting target using WEC is an access point to which the information processing apparatus 101 is currently connecting. In a case where the area 501 has been selected, the information processing apparatus 101 displays a list of access points and sets a new access point selected from the list by the user as a setting target using WEC. Furthermore, the list of access points is assumed to include, for example, an access point to which the information processing apparatus 101 has ever connected. The area 502 is an area for cancelling execution of WEC, and the area 503 is an area for issuing an instruction for execution of WEC. If the area 502 has been operated, the information processing apparatus 101 ends processing in the present sequence diagram, and then advances the processing to step S217. Furthermore, in this case, WEC is deemed to be failed. Moreover, if the area 503 has been pressed, the information processing apparatus 101 advances the processing to step S401.

In step S401, the WEC application executes an application programming interface (API) for WEC with use of WEC-related information or information about an access point set as a target for setting by WEC, so that an instruction for execution of WEC is issued to the OS. Then, processing called DPP authentication is performed between the information processing apparatus 101 and the communication apparatus 151 by the function of the OS. In the DPP authentication, for example, authentication information and information for use in encrypting information are communicated between the information processing apparatus 101 and the communication apparatus 151, so that authentication of communication between the information processing apparatus 101 and the communication apparatus 151 is performed. Furthermore, various pieces of information which are transmitted from the information processing apparatus 101 in a communication performed in the DPP authentication are encrypted based on WEC-related information previously acquired by the information processing apparatus 101 with the processing described with reference to FIGS. 2A and 2B. In the DPP authentication, specifically, first, the information processing apparatus 101 transmits an authentication request as a network setup request using the DPP. Next, the communication apparatus 151, which operates in the DPP awaiting mode, is operating in the DPP awaiting mode, which is a mode for awaiting an authentication request, and, therefore, receives the authentication request transmitted from the information processing apparatus 101. The communication apparatus 151, having received the authentication request, tries to decode the received authentication request with a decryption key which the communication apparatus 151 itself retains.

Then, when succeeding in the decryption, the communication apparatus 151 transmits an authentication response to the information processing apparatus 101, thus authenticating a communication with the information processing apparatus 101. Furthermore, in a case where the information processing apparatus 101 has not been able to acquire accurate WEC-related information and, thus, has not been able to accurately encrypt information, decryption in the communication apparatus 151 is failed, and, therefore, authentication is failed and the authentication response is not transmitted. In response to the authentication response being received by the information processing apparatus 101, the DPP authentication is completed. Moreover, in the DPP authentication, the DPP is used to perform communications.

Next, in step S402, processing called DPP configuration is performed between the information processing apparatus 101 and the communication apparatus 151 by the function of the OS. In the DPP configuration, the information processing apparatus 101 transmits, to the communication apparatus 151 by WEC, connection information for connecting to an access point set as a setting target by WEC. Furthermore, the connection information includes at least one of, for example, pieces of information indicating the SSID and password for an access point set as a setting target by WEC and an encryption method. The password to be transmitted at this time is information input by the user on a screen which an application compatible with the OS displays when a connection between the information processing apparatus 101 and the access point is established. Then, the password is information retained by the OS when a connection between the information processing apparatus 101 and the access point has been established. Moreover, the password is information which the setting application is not retaining. Moreover, since the password to be transmitted at this time is information which the OS is already retaining and the DPP configuration is processing which is performed by the OS, the password does not need to be newly input by the user on a screen which the setting application displays. Transmitting connection information by WEC as in the first example embodiment enables transmitting a password to the communication apparatus 151 without newly receiving inputting of a password from the user on a screen which the setting application displays and with use of a secure communication. Furthermore, even in the DPP configuration, a communication is performed with use of the DPP.

In step S403, the communication apparatus 151 ends the network setup mode and transitions to the infrastructure mode. Then, the communication apparatus 151 uses connection information acquired by WEC to try to connect to an access point corresponding to the connection information. In a case where the connection is successful, since then, the communication apparatus 151 becomes able to perform communication via a network which the connected access point forms. Furthermore, the communication which is performed via a network which the connected access point forms is performed according to a protocol different from the DPP (specifically, for example, Port9100, Simple Network Management Protocol (SNMP), or a vendor-specific protocol of the communication apparatus 151). Furthermore, the communication apparatus 151 can transmit, to the information processing apparatus 101, information indicating the success or failure of a connection to an access point corresponding to connection information acquired by WEC. Moreover, in a case where the connection to an access point corresponding to connection information acquired by WEC is failed, the communication apparatus 151 can further transmit, to the information processing apparatus 101, information indicating the cause of such a failure. Moreover, these information transmissions can be performed with use of the DPP. Furthermore, examples of the cause of a failure in connection to an access point corresponding to connection information acquired by WEC include an error in communication in WEC, the corresponding access point being undiscoverable, and WEC-related information acquired from the communication apparatus 151 being inappropriate information. Moreover, examples of such a cause include an encryption method for use in connecting to an access point set as a setting target by WEC being an encryption method with which the communication apparatus 151 is not compatible. Moreover, examples of such a cause include an encryption method for use in connecting to an access point set as a setting target by WEC being an encryption method with which WEC is not compatible. Furthermore, the information processing apparatus 101 can display, on the display unit 108, information indicating the success or failure of a connection between an access point corresponding to connection information acquired by WEC and the communication apparatus 151. Additionally, in a case where the connection between an access point corresponding to connection information acquired by WEC and the communication apparatus 151 is failed, the information processing apparatus 101 can display information indicating the cause of such a failure on the display unit 108. Furthermore, in the first example embodiment, before trying to connect to an access point with use of connection information acquired by WEC in step S403, the communication apparatus 151 switches outputting of a notification concerning a connection with the access point based on a starting condition for an operation in the network setup mode.

In step S404, in response to execution of WEC being ended, the information processing apparatus 101 switches an application operating in the foreground from the WEC application to the setting application. Then, the information processing apparatus 101 searches for the communication apparatus 151 on a network to which the information processing apparatus 101 itself belongs. The present processing is implemented by the setting application having received, from the OS, a notification indicating that execution of WEC has been ended. Then, in a case where the communication apparatus 151 has been discovered, the information processing apparatus 101 requests capability information from the communication apparatus 151, and the communication apparatus 151 transmits capability information to the information processing apparatus 101. With this processing, the information processing apparatus 101 registers information about the communication apparatus 151 on the setting application, and, since then, becomes able to perform communication with the communication apparatus 151 by the setting application. Specifically, for example, the information processing apparatus 101 becomes able to transmit a print job to the communication apparatus 151 by the setting application. Furthermore, at this time, in a case where the information processing apparatus 101 belongs to a network formed by an access point to which the communication apparatus 151 has connected by WEC, the information processing apparatus 101 becomes able to perform communication with the communication apparatus 151 via the access point. Moreover, in a case where a communication between the information processing apparatus 101 and the communication apparatus 151 is not able to be performed, such as a case where an access point to which the communication apparatus 151 has connected is not an access point to which the information processing apparatus 101 is connecting, a request or acquisition of capability information is omitted. Furthermore, a communication in step S404 is performed with use of, for example, a communication protocol different from both the DPP and a communication protocol for setup. After that, the information processing apparatus 101 ends the processing in the present sequence diagram, and then advances the processing to step S217.

Furthermore, while, in the above description, a configuration in which the WEC start screen is displayed by the WEC application and the WEC application executes the API for WEC to instruct the OS to execute WEC has been described, the present example embodiment is not limited to this configuration. For example, the WEC start screen can be configured to be displayed by the setting application. Moreover, a configuration in which the setting application executes the API for WEC to instruct the OS to execute WEC can be employed.

Next, processing which is performed by the information processing apparatus 101 and the communication apparatus 151 in step S224 is described with reference to FIG. 6. The sequence illustrated in FIG. 6 is implemented by, for example, a CPU of each apparatus reading out a program stored in, for example, a ROM of each apparatus or an external storage device onto a RAM of each apparatus and executing the program. Furthermore, as mentioned above, a communication protocol for setup is used in a communication performed via a Wi-Fi connection between the communication apparatus 151 operating in the network setup mode and the information processing apparatus 101.

In step S600, the information processing apparatus 101 requests a list of access points from the communication apparatus 151 via a Wi-Fi connection between the communication apparatus 151 operating in the network setup mode and the information processing apparatus 101, by the setting application.

Next, in step S601, the communication apparatus 151 transmits a list of access points to the information processing apparatus 101 via a Wi-Fi connection between the communication apparatus 151 operating in the network setup mode and the information processing apparatus 101. Furthermore, the list to be transmitted here is a list showing one or a plurality of access points to which the communication apparatus 151 is able to connect, which has been discovered by the communication apparatus 151 performing access point (AP) search.

Next, in step S602, the information processing apparatus 101 transmits, to the communication apparatus 151, connection information about any one of access points included in the received list via a Wi-Fi connection between the communication apparatus 151 operating in the network setup mode and the information processing apparatus 101.

Furthermore, the present processing is implemented by the setting application controlling the information processing apparatus 101 in such a way as to transmit connection information about any one of access points included in the received list. In the present processing, specifically, in a case where a connected AP is included in the received list, the information processing apparatus 101 transmits connection information about the connected AP. In the first example embodiment, since only access points to which the communication apparatus 151 is able to connect are included in the list, a case where a connected AP is included in the received list is thus a case where the communication apparatus 151 is able to connect to the connected AP. Moreover, in a case where the connected AP is not included in the received list, the information processing apparatus 101 displays the received list on the display unit 108 and receives, from the user, selection of any one of access points from the list. Then, the information processing apparatus 101 transmits connection information about the selected access point. In the first example embodiment, while only access points to which the communication apparatus 151 is able to connect are included in the list, in step S224, which is performed in the case of NO in step S211, since the connected AP and the communication apparatus 151 may be able to connect to each other, connection information about the connected AP is likely to be transmitted or connection information about an access point different from the connected AP is likely to be transmitted. Furthermore, the present example embodiment is not limited to this configuration, and a configuration in which a list is always displayed and selection of an access point is received from the user each time can be employed. Furthermore, before connection information is transmitted, the information processing apparatus 101 receives, from the user, inputting of a password for connecting to an access point on a screen which the setting application displays. Then, the information processing apparatus 101 causes the received password to be included in connection information and then transmits the connection information.

In step S603, the communication apparatus 151 communicates reception of the connection information to the information processing apparatus 101 via a Wi-Fi connection between the communication apparatus 151 operating in the network setup mode and the information processing apparatus 101.

In step S604, the communication apparatus 151 ends the network setup mode and then transitions to the infrastructure mode. Then, the communication apparatus 151 uses the connection information acquired in step S602 to try to connect to an access point corresponding to the connection information. In a case where the connection is successful, since then, the communication apparatus 151 becomes able to perform communication via a network which the connected access point forms.

In step S605, the information processing apparatus 101 reconnects to an access point to which the information processing apparatus 101 has been connecting when a setting operation has been performed, with use of stored connection information, by the setting application. Furthermore, the present example embodiment is not limited to this configuration. For example, in a case where, when the setting operation has been performed, for example, the information processing apparatus 101 has previously transmitted, to the communication apparatus 151, connection information about an access point different from the access point to which the information processing apparatus 101 has been connecting by Wi-Fi, the information processing apparatus 101 can connect to such a different access point.

In step S606, the information processing apparatus 101 searches for the communication apparatus 151 on a network to which the information processing apparatus 101 itself belongs, by the setting application. Then, in a case where the communication apparatus 151 has been discovered, the information processing apparatus 101 requests capability information from the communication apparatus 151, and the communication apparatus 151 transmits capability information to the information processing apparatus 101. With this processing, the information processing apparatus 101 registers information about the communication apparatus 151 on the setting application, and, since then, becomes able to perform communication with the communication apparatus 151 by the setting application. Specifically, for example, the information processing apparatus 101 becomes able to transmit a print job to the communication apparatus 151 by the setting application. Furthermore, at this time, in a case where the information processing apparatus 101 belongs to a network formed by an access point to which the communication apparatus 151 has connected by network setup, the information processing apparatus 101 becomes able to perform communication with the communication apparatus 151 via the access point. Furthermore, in a case where a communication between the information processing apparatus 101 and the communication apparatus 151 is not able to be performed, such as a case where an access point to which the communication apparatus 151 has connected is not an access point to which the information processing apparatus 101 is connecting, a request or acquisition of capability information is omitted. Furthermore, a communication in step S606 is performed with use of, for example, a communication protocol different from both the DPP and a communication protocol for setup (specifically, for example, Canon HTTP Management Protocol (CHMP)). Then, the information processing apparatus 101 ends the processing in the present sequence diagram.

Furthermore, in step S602, the information processing apparatus 101 can transmit, to the communication apparatus 151, a connection request for performing direct connection with the communication apparatus 151 via a Wi-Fi connection between the communication apparatus 151 operating in the network setup mode and the information processing apparatus 101. In this case, instead of the above-mentioned processing in steps S603 to S605, the communication apparatus 151 transmits, to the information processing apparatus 101, connection information about an access point which is enabled within the communication apparatus 151 at the time of the P2P mode, ends the network setup mode, and then transitions to the P2P mode.

Then, the information processing apparatus 101 establishes a P2P connection with the communication apparatus 151 with use of the received connection information. After that, processing in step S606 is performed. Furthermore, at this time, the network to which the information processing apparatus 101 belongs is a network formed by an access point which is enabled within the communication apparatus 151.

Furthermore, the content of processing in the above-described sequence diagram is not limited to the above-described content. For example, in a case where an access point to which the information processing apparatus 101 has been connecting by Wi-Fi when the setting operation has been performed is not included in the received list, the information processing apparatus 101 does not need to transmit connection information about an access point. Thus, the information processing apparatus 101 does not need to try to establish a connection between the communication apparatus 151 and an access point. Instead, the information processing apparatus 101 can receive, from the communication apparatus 151, connection information about an access point which is enabled within the communication apparatus 151 at the time of the P2P mode, and can try to establish a connection between the communication apparatus 151 operating in the P2P mode and the information processing apparatus 101. In the case of such a configuration, the communication apparatus 151 transmits connection information about an access point which is enabled within the communication apparatus 151 at the time of the P2P mode, and, after that, ends the network setup mode and transitions to the P2P mode. The P2P mode to which the communication apparatus 151 transitions at this time can be an access point (AP) mode or can be a Wi-Fi Direct (WFD) mode.

Next, processing which is performed by the information processing apparatus 101 in step S225, which is performed in the case of NO in step S212 or NO in step S213, is described with reference to FIG. 7. A flowchart illustrated in FIG. 7 is implemented by, for example, the CPU 103 reading out a program stored in, for example, the ROM 104 or the external storage device 106 onto the RAM 105 and executing the program.

In step S701, the CPU 103 acquires connection information about an access point from the OS. The access point corresponding to the connection information to be acquired here is assumed to be, for example, an access point which has ever connected to the information processing apparatus 101, and the OS is assumed to currently store a password which has been input by the user at the time of connection with the access point. For example, the password is information input by the user on a screen which an application compatible with the OS displays when a connection between the information processing apparatus 101 and the access point is established. Then, the password is information retained by the OS when a connection between the information processing apparatus 101 and the access point has been established. Moreover, the password is information which the setting application is not retaining. Furthermore, in the first example embodiment, the encryption method with which the communication apparatus 151 is compatible is WPA, WPA2, or WPA3, and the encryption method with which the communication apparatus 151 is not compatible is Wired Equivalent Privacy (WEP). Then, the CPU 103 determines whether there is an access point compatible with the encryption method with which the communication apparatus 151 is compatible in access points corresponding to the connection information acquired from the OS. If the result of determination in step S701 is yes (YES in step S701), the CPU 103 advances the processing to step S702, and, if the result of determination in step S701 is no (NO in step S701), the CPU 103 advances the processing to step S707.

In step S702, the CPU 103 identifies an access point compatible with the encryption method with which the communication apparatus 151 is compatible out of access points corresponding to the connection information acquired from the OS. In step S702, a plurality of access points can be identified or a single access point can be identified.

In step S703, the CPU 103 acquires, from the OS, information about a frequency band which has been used for connection to the access point identified in step S702. Then, the CPU 103 determines whether an access point compatible with a frequency band with which the communication apparatus 151 is compatible is present in access points identified in step S702. Furthermore, in the first example embodiment, the communication apparatus 151 is assumed to include a type which is compatible with both a frequency band of 2.4 GHz and a frequency band of 5 GHz and a type which is compatible with a frequency band of 2.4 GHz but is not compatible with a frequency band of 5 GHz. Then, the communication apparatus 151 is not able to connect to an access point depending on a frequency band with which the communication apparatus 151 is not compatible. Therefore, for example, in a case where the frequency band which has been used for connection to the identified access point is a frequency band of 5 GHz and the communication apparatus 151 is not compatible with a frequency band of 5 GHz, the result of determination in step S703 becomes no. If the result of determination in step S703 is yes (YES in step S703), the CPU 103 advances the processing to step S704, and, if the result of determination in step S703 is no (NO in step S703), the CPU 103 advances the processing to step S707.

In step S704, the CPU 103 identifies an access point compatible with a frequency band with which the communication apparatus 151 is compatible out of access points identified in step S702. In step S704, a plurality of access points can be identified or a single access point can be identified.

Here, for example, there is assumed to be an access point the encryption method of which for use in Wi-Fi communication is WPA2 and the frequency band of which is a frequency band of 2.4 GHz in access points to which the information processing apparatus 101 has ever connected. In this case, an access point is identified in step S704 in a case where the communication apparatus 151 is compatible with WPA2 and is also compatible with a frequency band of 2.4 GHz. Furthermore, the information processing apparatus 101 is assumed to, when connecting to an access point, acquire, from the access point, information about an encryption method and a frequency band which are used for Wi-Fi communication with the access point and then cause the OS to store such information.

Figure 8A:
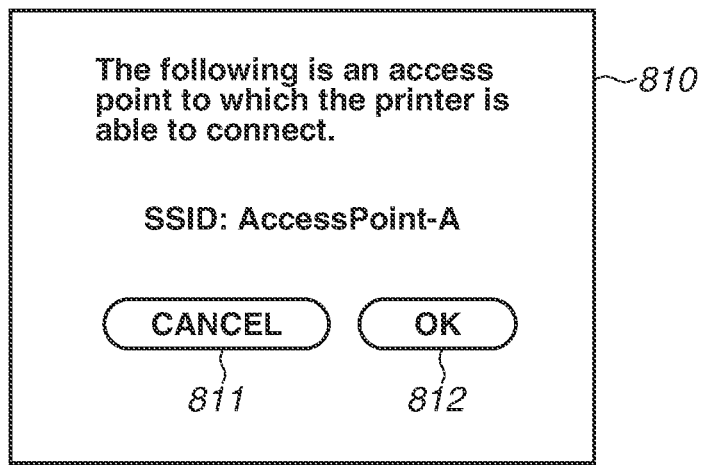
FIGS. 8A, 8B, and 8C are diagrams illustrating examples of WEC start screens.

In step S705, the CPU 103 performs processing for establishing a connection between the communication apparatus 151 and the access point identified in step S704. Furthermore, the processing is, in other words, processing for transmitting information about the access point identified in step S704 to the communication apparatus 151 by WEC. Moreover, in the first example embodiment, an access point to which the communication apparatus 151 is able to connect is an access point identified in step S704 and is an access point compatible with an encryption method and a frequency band with which the communication apparatus 151 is compatible. For example, the CPU 103 displays, on the screen of the information processing apparatus 101, a notification for prompting the user to select an access point to which the communication apparatus 151 is able to connect (an access point identified in step S704) in a screen of the WEC application which is started in step S706. FIG. 8A illustrates an example of a screen 810 which is displayed in step S705, which is an example of the screen in a case where only one access point is identified in step S704. Furthermore, the screen illustrated in FIG. 8A can be a screen for a notification prompting the user to select the access point identified in step S704 from among access points to which the information processing apparatus 101 has ever connected in a screen of the WEC application which is started in step S706. For example, in the screen which is displayed, a notification such as "Please select the following access point in a screen to be displayed next." can be displayed. In a case where an area 812 illustrated in FIG. 8A has been operated by the user, the CPU 103 advances the processing to step S705, and, in a case where an area 811 illustrated in FIG. 8A has been selected by the user, the CPU 103 ends the processing in the present flowchart. Furthermore, in WEC, generally, information concerning an access point to which the information processing apparatus 101 is connecting is transmitted at the time of execution of WEC. Therefore, in step S705, as processing for establishing a connection between the communication apparatus 151 and an access point to which the communication apparatus 151 is able to connect, the CPU 103 can perform processing for establishing a connection between the information processing apparatus 101 and an access point to which the communication apparatus 151 is able to connect. Moreover, after displaying, on the screen of the information processing apparatus 101, a notification for prompting the user to select an access point to which the communication apparatus 151 is able to connect in a screen of the WEC application which is started in step S706, the CPU 103 can perform processing for establishing a connection between the information processing apparatus 101 and an access point to which the communication apparatus 151 is able to connect.

Figure 8B:
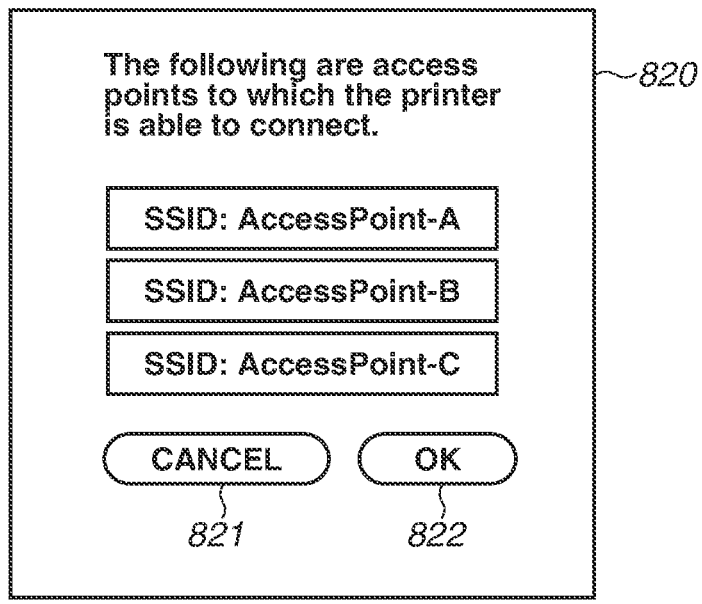

Furthermore, in a case where there is a plurality of access points identified in step S704, the CPU 103 displays the plurality of access points identified in step S704. FIG. 8B illustrates an example of a screen 820 which is displayed in step S705, which is an example of the screen in a case where a plurality of access points is identified in step S704. Furthermore, the screen illustrated in FIG. 8B can be a screen for a notification prompting the user to select any access point in a plurality of access points to which the communication apparatus 151 is able to connect from among access points to which the information processing apparatus 101 has ever connected in a screen of the WEC application which is started in step S706. For example, in the screen which is displayed, a notification such as "Please select any access point in the following access points in a screen to be displayed next." can be displayed. In a case where an area 822 illustrated in FIG. 8B has been operated by the user, the CPU 103 advances the processing to step S706, and, in a case where an area 821 illustrated in FIG. 8B has been selected by the user, the CPU 103 ends the processing in the present flowchart.

With the above-mentioned processing performed, in the first example embodiment, as a result, the access points which are displayed in the screens illustrated in FIGS. 8A and 8B include only access points to which the communication apparatus 151 is able to connect. For example, an access point connectable by an encryption method which is not compatible with the communication apparatus 151 is not displayed, because the communication apparatus 151 is not able to connect to such an access point. Moreover, an access point connectable by a frequency band which is not compatible with the communication apparatus 151 is not displayed, because the communication apparatus 151 is not able to connect to such an access point. Thus, in step S225, which is performed in the case of NO in step S212 or in the case of NO in step S213, as a result, connection information about an access point different from the connected AP is transmitted to the communication apparatus 151.

Furthermore, information about an access point to which the communication apparatus 151 is able to connect can be displayed not in a notification screen which is displayed in a state in which the setting application is running in the foreground, such as the screen illustrated in FIG. 8A or 8B but as a pop-up notification which is performed with use of, for example, a push notification function. Then, even in a case where a screen of the WEC application which is started in step S706 is displayed, the pop-up notification can be displayed in parallel with the screen of the WEC application. This enables the user to, while viewing information about an access point displayed as a pop-up notification, select the access point in the screen of the WEC application. Furthermore, the pop-up notification and the screen of the WEC application can be displayed concurrently. Thus, steps S706 and S705 can be performed concurrently. Moreover, for example, the pop-up notification can be displayed after the screen of the WEC application is displayed. Thus, step S705 can be performed after processing in step S706 is performed.

In step S706, the CPU 103 performs processing for starting the WEC application as processing for executing WEC with use of the acquired WEC-related information. Furthermore, the present processing is similar to the processing described above in step S400 illustrated in FIG. 4. When the WEC application is started, as mentioned above, a screen of the WEC application used for selecting whether to transmit connection information about an access point to which the information processing apparatus 101 is connecting (the WEC start screen 500) is displayed. Then, in a case where the area 501 of the WEC start screen 500 has been operated, a list of access points to which the information processing apparatus 101 has ever connected is displayed. Then, in a case where an access point displayed as a notification in step S705 has been selected by the user from among the access points to which the information processing apparatus 101 has ever connected, connection information about an access point to which the communication apparatus 151 is able to connect is transmitted to the communication apparatus 151 by WEC. Thus, the user is able to cause connection information about an access point to which the communication apparatus 151 is able to connect to be transmitted to the communication apparatus 151 is able to connect, by checking an access point displayed as a notification in step S705 and selecting the access point displayed as a notification in step S705 from a list of access points displayed by an operation on the area 501 of the WEC start screen 500. Furthermore, the information processing apparatus 101 is assumed to store passwords for the access points to which the information processing apparatus 101 has ever connected. Furthermore, subsequent execution processing for WEC is processing similar to that illustrated in FIG. 4. Furthermore, the connection information includes at least one of, for example, pieces of information indicating the SSID and password for an access point set as a setting target by WEC and an encryption method. Furthermore, since the password to be transmitted at this time is information which the OS is already retaining and the DPP configuration is processing which is performed by the OS, the password does not need to be newly input by the user on a screen which the setting application displays. Furthermore, in a case where the information processing apparatus 101 is not connecting to an access point corresponding to the connection information transmitted to the communication apparatus 151, the CPU 103 can establish a connection between the information processing apparatus 101 and the corresponding access point in step S706.

In step S707, which is performed in the case of NO in step S701 or in the case of NO in step S703, the CPU 103 instructs the OS of the information processing apparatus 101 to search for access points near the information processing apparatus 101, and acquires a result of such search by the setting application. Then, the CPU 103 displays a list of access points discovered by the search, and displays, on the screen, a notification for prompting the user to select which access point in the list to cause to connect to the communication apparatus 151 (not illustrated). If any access point has been selected, the CPU 103 advances the processing to step S708, and, if, for example, a cancel button (not illustrated) displayed in the screen has been selected, the CPU 103 ends the processing in the present flowchart.

Furthermore, the CPU 103 can display, as a list, only access points to which the communication apparatus 151 is able to connect out of the access points discovered by the search. Furthermore, a list of access points can be displayed not by the setting application but by the OS. For example, a screen which is displayed by the OS can be a Wi-Fi setting screen of the information processing apparatus 101.

Figure 8C:
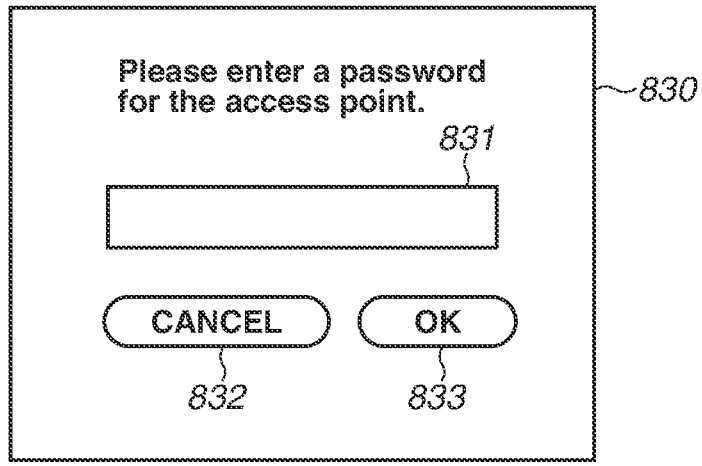

In step S708, the CPU 103 displays, on the screen, a notification for prompting the user to input a password for the access point selected in step S707. FIG. 8C illustrates an example of a notification (input) screen 830 for prompting the user to input a password. If a password has been input to an area 831 illustrated in FIG. 8C and an area 833 has been operated, the CPU 103 advances the processing to step S709, and, if an area 832 has been operated, the CPU 103 ends the processing in the present flowchart. Furthermore, even in a case where a password has been input to the area 831 and the area 833 has been operated, if the input password is not a correct password, a notification for prompting the user to input a correct password again can be displayed on the screen.

In step S709, the CPU 103 performs processing for establishing a connection between the access point selected by the user in step S707 and the information processing apparatus 101. Furthermore, in WEC, usually, information concerning an access point to which the information processing apparatus 101 is connecting at the time of execution of WEC is transmitted. Therefore, the present processing is performed in preparation for execution of WEC in step S710.

In step S710, the CPU 103 performs processing for starting the WEC application as processing for executing WEC with use of the acquired WEC-related information. Furthermore, the present processing is similar to the processing described above in step S400 illustrated in FIG. 4. When the WEC application is started, as mentioned above, a screen used for selecting whether to transmit connection information about an access point to which the information processing apparatus 101 is connecting (the WEC start screen 500) is displayed. In the present processing, the access point to which the information processing apparatus 101 is connecting is an access point selected by the user in step S707 and is an access point to which the information processing apparatus 101 has connected in step S709. Furthermore, subsequent execution processing for WEC is processing similar to that illustrated in FIG. 4. This enables the user to cause connection information about the access point selected in step S707 to be transmitted to the communication apparatus 151. Furthermore, the connection information includes at least one of, for example, pieces of information indicating the SSID and password for an access point set as a setting target by WEC and an encryption method. Furthermore, the password to be transmitted at this time is a password input by the user in step S708.

In the above-mentioned step S707, instead of acquiring a result of searching for nearby access points and displaying a screen for prompting the user to select to which access point to cause the communication apparatus 151 to connect, the CPU 103 can display a screen for prompting the user to input the SSID of an access point.

Furthermore, the above-mentioned determinations in steps S701 to S706 can be omitted and, in step S225, processing in steps S707 to S710 can be performed. Thus, a configuration in which, in step S225, a list of access points near the information processing apparatus 101 is always displayed and the user is prompted to select an access point caused to connect to the communication apparatus 151 can be employed.

Moreover, processing in steps S701 to S705 does not need to be performed. For example, in step S225, the CPU 103 displays, on the screen, a notification indicating that the communication apparatus 151 is not able to be caused to connect to the connected AP by WEC, and, in step S706, the CPU 103 performs processing for starting the WEC application. As mentioned above, in a case where the area 501 of the WEC start screen 500 has been operated, a list of access points to which the information processing apparatus 101 has ever connected is displayed. Then, in a case where a predetermined access point has been selected by user from among the access points to which the information processing apparatus 101 has ever connected, connection information about the predetermined access point is transmitted to the communication apparatus 151 by WEC. Thus, the user is able to check a notification indicating that the communication apparatus 151 is not able to be caused to connect to the connected AP by WEC, and is able to select an access point other than the connected AP from a list of access points displayed by an operation on the area 501 of the WEC start screen 500. This enables the user to select an access point other than the connected AP, which is not able to connect to the communication apparatus 151. Furthermore, the notification indicating that the communication apparatus 151 is not able to be caused to connect to the connected AP by WEC can be displayed as a pop-up notification. Then, the pop-up notification can continue being displayed even in a case where the screen of the WEC application has been displayed. Furthermore, the pop-up notification and the screen of the WEC application can be displayed concurrently, and the pop-up notification can be displayed after the screen of the WEC application is displayed.

Additionally, while, if the result of determination in step S701 illustrated in FIG. 7 is no, the CPU 103 advances the processing to step S707, the first example embodiment is not limited to this. For example, if the result of determination in step S701 is no, the CPU 103 can advance the processing to step S224 illustrated in FIG. 2B, so that network setup using the protocol for setup can be performed.

As described above, in the first example embodiment, in a case where the communication apparatus 151 is able to use a predetermined access point targeted for setting, the CPU 103 controls the information processing apparatus 101 to transmit connection information about the predetermined access point to the communication apparatus 151 by WEC. Moreover, in a case where the communication apparatus 151 is not able to use a predetermined access point targeted for setting, the CPU 103 controls the information processing apparatus 101 to transmit, to the communication apparatus 151, connection information about an access point to which the communication apparatus 151 is able to connect and which is different from the predetermined access point. Furthermore, the case where the communication apparatus 151 is able to use a predetermined access point is, for example, a case where the communication apparatus 151 is compatible with an encryption method which is used for connection to the predetermined access point and a case where the communication apparatus 151 is compatible with a frequency band which is used for connection to the predetermined access point. Then, the case where the communication apparatus 151 is not able to use a predetermined access point is, for example, a case where the communication apparatus 151 is not compatible with an encryption method which is used for connection to the predetermined access point or a case where the communication apparatus 151 is not compatible with a frequency band which is used for connection to the predetermined access point.

With such a configuration employed, in a case where a connection between the predetermined access point and the communication apparatus 151 is able to be established by WEC, the CPU 103 performs setup by WEC.

Moreover, in a case where a connection between the predetermined access point and the communication apparatus 151 is not able to be established by WEC, the CPU 103 establishes a connection between an access point different from the predetermined access point, to which the communication apparatus 151 is able to connect, and the communication apparatus 151 by WEC. This enables surely implementing easy setup in which, for example, inputting of a password by the user is omitted. Additionally, in a case where the information processing apparatus 101 or the communication apparatus 151 is not compatible with WEC or in a case where WEC is not compatible with an encryption method which is used for connection to the predetermined access point, the CPU 103 performs network setup using the protocol for setup. This enables more surely performing setup of the communication apparatus 151.

A configuration different from that in the first example embodiment and available for solving issues in the present disclosure is described.

In the above-described first example embodiment, as being equivalent to processing from NO in step S209 to step S220, in a case where WEC-related information has not been able to be acquired from the communication apparatus 151 operating in the network setup mode, the CPU 103 acquires WEC-related information by a method different from the method of acquiring WEC-related information from the communication apparatus 151 operating in the network setup mode. However, in a second example embodiment, without trying to acquire WEC-related information by a connection between the information processing apparatus 101 and the communication apparatus 151 operating in the network setup mode, the CPU 103 acquires WEC-related information by a different method from the start. For example, the CPU 103 acquires WEC-related information by reading of a QR code displayed on the communication apparatus 151. This enables implementing setup by a smaller amount of processing than that in the first example embodiment.

Unless otherwise stated, a communication system in the second example embodiment is assumed to be a communication system similar to that in the first example embodiment.

Figure 9B:
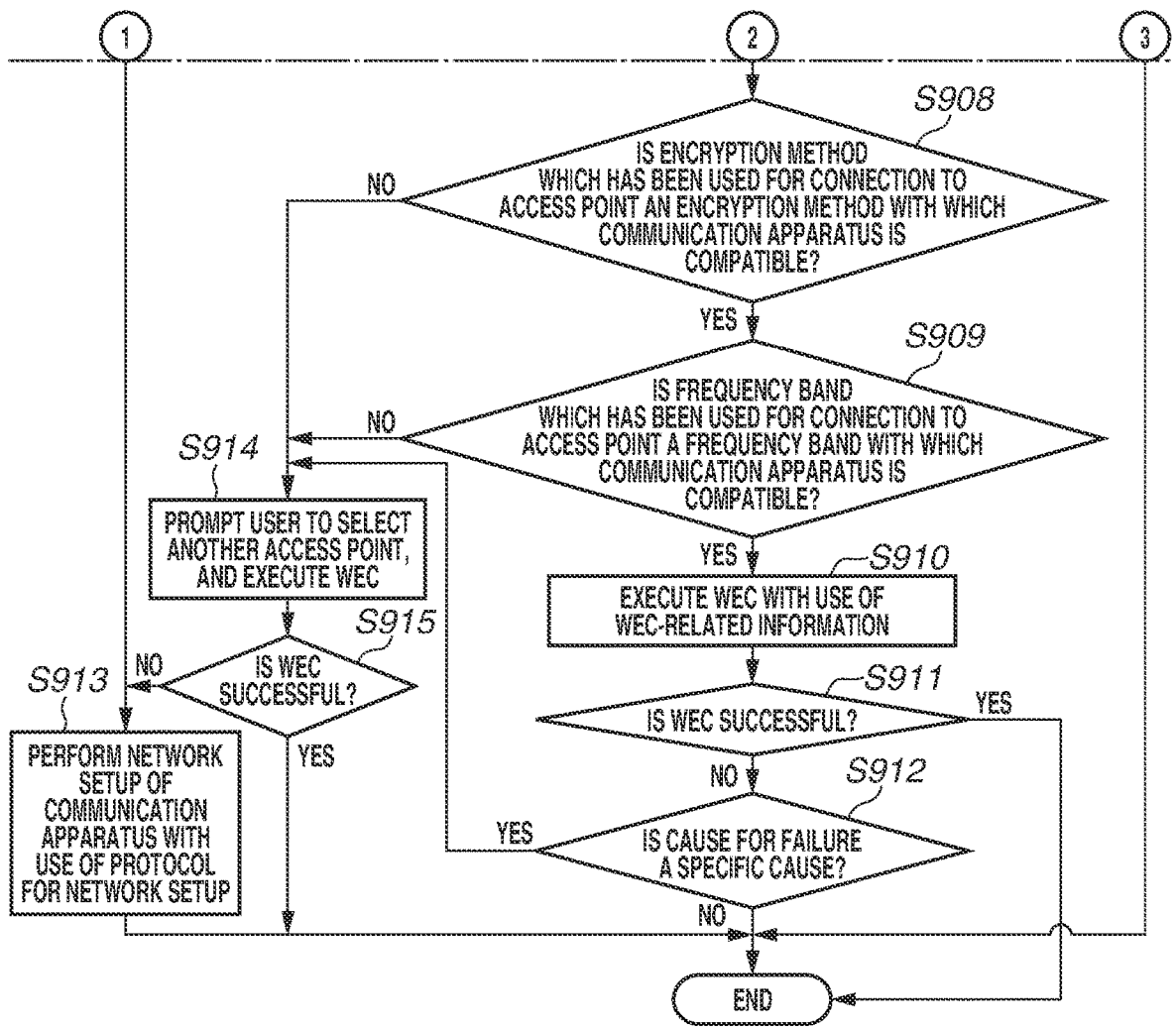

FIGS. 9A and 9B are flowcharts illustrating the flow of processing which the information processing apparatus 101 performs in the network setup processing in the second example embodiment. The flowcharts of FIGS. 9A and 9B are implemented by, for example, the CPU 103 reading out a setting application stored in, for example, the ROM 104 or the external storage device 106 onto the RAM 105 and executing the setting application. Moreover, the flowcharts of FIGS. 9A and 9B are started in response to a setting operation being performed in a screen which the setting application displays.

Processing in steps S901 and S902 is processing similar to that in steps S205 and S206. If the result of determination in step S902 is yes (YES in step S902), the CPU 103 advances the processing to step S903, and, if the result of determination in step S902 is no (NO in step S902), the CPU 103 advances the processing to step S913.

In step S903, the CPU 103 tries to acquire WEC-related information by a method different from the method of acquiring WEC-related information from the communication apparatus 151 operating in the network setup mode. Specifically, for example, the CPU 103 tries to acquire WEC-related information by reading of a QR code displayed on the communication apparatus 151. The details of processing in step S903 are similar to those in step S220. Furthermore, in step S903, the CPU 103 acquires, in addition to WEC-related information, capability information about the communication apparatus 151, and then stores such information in a predetermined memory.

Next, in step S904, the CPU 103 determines whether the communication apparatus 151 is compatible with WEC, based on the information acquired in step S903. The details of processing in step S904 are similar to those in step S208. If the result of determination in step S904 is yes (YES in step S904), the CPU 103 advances the processing to step S905, and, if the result of determination in step S904 is no (NO in step S904), the CPU 103 advances the processing to step S913. Furthermore, in a case where the CPU 103 has not been able to acquire information in step S903, the result of determination in step S904 becomes no.

Next, in step S905, the CPU 103 determines whether WEC-related information has been able to be acquired from the communication apparatus 151 in step S903. The details of processing in step S905 are similar to those in step S209. If the result of determination in step S905 is yes (YES in step S905), the CPU 103 advances the processing to step S906, and, if the result of determination in step S905 is no (NO in step S905), the CPU 103 ends the processing in the present flowchart. Furthermore, a case where the result of determination in step S905 becomes no is, for example, a case where, while information indicating that the communication apparatus 151 is compatible with WEC has been acquired, WEC-related information has not been acquired due to, for example, a communication error.

In step S906, the CPU 103 acquires capability information about the communication apparatus 151 acquired in step S903 from the predetermined memory. The details of processing in step S906 are similar to those in step S210.

Next, in step S907, the CPU 103 determines whether the encryption method which has been used for connection to the connected AP is an encryption method compatible with WEC (compatible with the DPP). The details of processing in step S907 are similar to those in step S211. If the result of determination in step S907 is yes (YES in step S907), the CPU 103 advances the processing to step S908, and, if the result of determination in step S907 is no (NO in step S907), the CPU 103 advances the processing to step S913.

Next, in step S908, the CPU 103 determines whether the encryption method which has been used for connection to the connected AP is an encryption method with which the communication apparatus 151 is compatible, based on the capability information acquired in step S906. The details of processing in step S908 are similar to those in step S212. If the result of determination in step S908 is yes (YES in step S908), the CPU 103 advances the processing to step S909, and, if the result of determination in step S908 is no (NO in step S908), the CPU 103 advances the processing to step S914.

Next, in step S909, the CPU 103 determines whether the frequency band which has been used for connection to the connected AP is a frequency band with which the communication apparatus 151 is compatible, based on the capability information acquired in step S906. The details of processing in step S909 are similar to those in step S213. If the result of determination in step S909 is yes (YES in step S909), the CPU 103 advances the processing to step S910, and, if the result of determination in step S909 is no (NO in step S909), the CPU 103 advances the processing to step S914.

Next, in step S910, the CPU 103 performs processing for executing WEC with use of the acquired WEC-related information. The details of processing in step S910 are similar to those in step S216.

In step S911, the CPU 103 determines whether the establishment of a connection between the access point and the communication apparatus 151 is successful, by the executed WEC. The details of processing in step S911 are similar to those in step S217. If the result of determination in step S911 is yes (YES in step S911), the CPU 103 ends the processing, and, if the result of determination in step S911 is no (NO in step S911), the CPU 103 advances the processing to step S912.

In step S912, the CPU 103 determines whether a cause for the establishment of a connection between the access point and the communication apparatus 151 having been unsuccessful is a specific cause, by the executed WEC. Furthermore, in the second example embodiment, information about a cause for the establishment of a connection between the access point and the communication apparatus 151 having been unsuccessful is assumed to be acquired from the communication apparatus 151 by the executed WEC, and the present determination is assumed to be performed based on the acquired information. Moreover, in the second example embodiment, the specific cause is, for example, an error having occurred in a communication in WEC (cause 1).

If the result of determination in step S912 is yes (YES in step S912), the CPU 103 advances the processing to step S914, and, if the result of determination in step S912 is no (NO in step S912), the CPU 103 ends the processing. Furthermore, if the result of determination in step S912 is yes, the CPU 103 can advance the processing to step S913.

Then, processing in step S913 is processing similar to that in step S224, processing in step S914 is processing similar to that in step S225, and processing in step S915 is processing similar to that in step S226.

As described above, in the second example embodiment, without trying to acquire WEC-related information by a connection between the information processing apparatus 101 and the communication apparatus 151 operating in the network setup mode, the CPU 103 acquires WEC-related information by reading of a QR code. This enables implementing setup with a smaller amount of processing than that in the first example embodiment. Additionally, it is possible to decrease a possibility in which, when the CPU 103 has advanced the processing from steps S220 and S221 to step S216 in the first example embodiment, the establishment of a connection between the access point and the communication apparatus 151 becomes unsuccessful due to the cause 2 or the cause 3.

While, in the above-described first example embodiment, a configuration in which, in the network setup in step S224, connection information is transmitted via a connection between the information processing apparatus 101 and the communication apparatus 151 by Wi-Fi has been described, the first example embodiment is not limited to this configuration. For example, in the network setup, connection information can be transmitted via a connection between the information processing apparatus 101 and the communication apparatus 151 by a communication method other than Wi-Fi, such as BLE. Furthermore, in the case of this configuration, the information processing apparatus 101 is able to connect to the communication apparatus 151 by BLE while maintaining a Wi-Fi connection with the connected AP. Thus, the CPU 103 is able to transmit connection information about an access point to which the information processing apparatus 101 is connecting as connection information about the connected AP. Furthermore, even in this configuration, a communication protocol different from the DPP is assumed to be used.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-193680 filed Nov. 29, 2021, which is hereby incorporated by reference herein in its entirety.

What is claimed is:

1. A method of an information processing apparatus, the information processing apparatus configured to communicate with a communication apparatus, the method performed by executing a program that causes a first application in the information processing apparatus to perform the method, and the method comprising:

receiving, first information concerning the communication apparatus;

displaying, based on it being determined that the communication apparatus is not able to connect to a first network based on the first information, information concerning a second network which is different from the first network and to which the communication apparatus is able to connect, based on the first information; and starting a second application which is an application different from the first application and which transmits, to the communication apparatus via a communication with the communication apparatus, connection information which is used for the communication apparatus to connect to any one of networks, wherein, in a case where, in the second application, the displayed information concerning the second network has been selected, connection information about the second network is transmitted to the communication apparatus by the second application, and wherein, without inputting of a password for connecting to the second network being received from a user, connection information for connecting to the second network including the password is transmitted to the communication apparatus via a communication with the communication apparatus.

2. The method according to claim 1, wherein the information concerning the second network is displayed as a pop-up notification and is displayed in parallel with a screen which is displayed by the second application.

3. The method according to claim 1, wherein a case where the communication apparatus is not able to connect to the first network includes a case where an encryption method which is used for connection to the first network is an encryption method with which the communication apparatus is not compatible.

4. The method according to claim 1, wherein a case where the communication apparatus is not able to connect to the first network includes a case where a frequency band which is used for connection to the first network is a frequency band with which the communication apparatus is not compatible.

5. The method according to claim 1, wherein the first network is a network to which the information processing apparatus has been wirelessly connecting at least when a setting operation has been performed.

6. The method according to claim 5, wherein the setting operation is an operation for starting network setup of the communication apparatus.

7. The method according to claim 1, wherein the second network is a network a password which the information processing apparatus stores.

8. The method according to claim 1, wherein the second network is a network with regard to which authentication information and a password have been input by a user.

9. The method according to claim 1, wherein the first application is an application for communication by Simple Network Management Protocol, and the second application is an application for communication by Device Provisioning Protocol.

10. A method of an information processing apparatus, the information processing apparatus configured to communicate with a communication apparatus, the method performed by executing a program, and the method comprising:

receiving first information concerning the communication apparatus with use of a first communication protocol by a communication method of IEEE 802.11 series;

displaying, based on it being determined that the communication apparatus is not able to connect to a first network based on the first information, information concerning a second network which is different from the first network and to which the communication apparatus is able to connect, based on the first information;

acquiring, from the communication apparatus, information which is used for a communication with the communication apparatus using a second communication protocol; and performing control in such a manner that connection information which is used for the communication apparatus to connect to any one of networks is transmitted to the communication apparatus via a communication with the communication apparatus using a second communication protocol different from the first communication protocol by the communication method of IEEE 802.11 series, wherein the information which is used for a communication with the communication apparatus using the second communication protocol is acquired via a communication with the communication apparatus using the first communication protocol.

11. The method according to claim 10, further comprising storing a predetermined application program different from the program, wherein, in a case where the displayed information concerning the second network has been selected in a screen which is displayed by the predetermined application program, connection information about the second network is transmitted to the communication apparatus by the predetermined application program.

12. The method according to claim 10, wherein the information concerning the second network is displayed as a pop-up notification and is displayed in parallel with a screen which is displayed by the predetermined application program.

13. The method according to claim 10, wherein the second communication protocol is Device Provisioning Protocol.

14. The method according to claim 10, wherein the first communication protocol is Simple Network Management Protocol.

15. A method of an information processing apparatus, the information processing apparatus configured to communicate with a communication apparatus, the method performed by executing a program that causes a first application in the information processing apparatus to perform the method, and the method comprising:

receiving, first information concerning the communication apparatus;

displaying, based on it being determined that the communication apparatus is not able to connect to a first network based on the first information, information concerning a second network which is different from the first network and to which the communication apparatus is able to connect, based on the first information; and starting a second application which is an application different from the first application and which transmits, to the communication apparatus via a communication with the communication apparatus, connection information which is used for the communication apparatus to connect to any one of networks, wherein a case where the communication apparatus is not able to connect to the first network includes at least one case of (i) a case where an encryption method which is used for connection to the first network is an encryption method with which the communication apparatus is not compatible or (ii) a case where a frequency band which is used for connection to the first network is a frequency band with which the communication apparatus is not compatible.

16. The method according to claim 15, wherein the first application is an application for communication by Simple Network Management Protocol, and the second application is an application for communication by Device Provisioning Protocol.

\* \* \* \* \*